(12) United States Patent
Nonaka et al.

(10) Patent No.: US 9,945,013 B2
(45) Date of Patent: Apr. 17, 2018

(54) HOT STAMPED STEEL AND METHOD FOR PRODUCING HOT STAMPED STEEL

(71) Applicant: Nippon Steel & Sumitomo Metal Corporation, Tokyo (JP)

(72) Inventors: Toshiki Nonaka, Tokyo (JP); Satoshi Kato, Tokyo (JP); Kaoru Kawasaki, Tokyo (JP); Toshimasa Tomokiyo, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 453 days.

(21) Appl. No.: 14/371,512

(22) PCT Filed: Jan. 11, 2013

(86) PCT No.: PCT/JP2013/050385
§ 371 (c)(1),
(2) Date: Jul. 10, 2014

(87) PCT Pub. No.: WO2013/105633
PCT Pub. Date: Jul. 18, 2013

(65) Prior Publication Data
US 2015/0010775 A1  Jan. 8, 2015

(30) Foreign Application Priority Data
Jan. 13, 2012  (JP) ................. 2012-004550

(51) Int. Cl.
B32B 15/00 (2006.01)
C22C 38/06 (2006.01)
(Continued)

(52) U.S. Cl.
CPC .............. C22C 38/06 (2013.01); B32B 15/01 (2013.01); C21D 8/0226 (2013.01);
(Continued)

(58) Field of Classification Search
None
See application file for complete search history.

(56) References Cited

U.S. PATENT DOCUMENTS

2005/0133124 A1  6/2005  Kawano et al.
2007/0023113 A1  2/2007  Ikeda et al.
(Continued)

FOREIGN PATENT DOCUMENTS

CA  2782777 A1  7/2011
CA  2787575 A1  8/2011
(Continued)

OTHER PUBLICATIONS

Office Action dated Jul. 3, 2015 issued in Chinese Application No. 201380005163.2 [with English Translation].
(Continued)

Primary Examiner — Daniel J Schleis
(74) Attorney, Agent, or Firm — Birch, Stewart, Kolasch & Birch LLP

(57) ABSTRACT

A hot stamped steel according to the present invention satisfies an expression of $(5\times[Si]+[Mn])/[C]>11$ when [C] represents an amount of C by mass %, [Si] represents an amount of Si by mass %, and [Mn] represents an amount of Mn by mass %, a metallographic structure after hot stamping includes 40% to 90% of a ferrite and 10% to 60% of a martensite in an area fraction, a total of an area fraction of the ferrite and an area fraction of the martensite is 60% or more, a hardness of the martensite measured with a nanoindenter satisfies an $H2/H1<1.10$ and $\sigma HM<20$, and $TS\times\lambda$, which is a product of a tensile strength TS and a hole expansion ratio $\lambda$ is 50000 MPa·% or more.

13 Claims, 6 Drawing Sheets

(51) Int. Cl.
  *C23C 2/06* (2006.01)
  *C23C 2/12* (2006.01)
  *C23C 2/28* (2006.01)
  *C21D 9/46* (2006.01)
  *C21D 8/02* (2006.01)
  *C23C 2/02* (2006.01)
  *C23C 2/26* (2006.01)
  *C23C 2/40* (2006.01)
  *C22C 38/00* (2006.01)
  *C22C 38/02* (2006.01)
  *C22C 38/04* (2006.01)
  *C22C 38/12* (2006.01)
  *C22C 38/14* (2006.01)
  *C22C 38/18* (2006.01)
  *B32B 15/01* (2006.01)
  *C22C 38/08* (2006.01)
  *C22C 38/16* (2006.01)
  *C22C 38/22* (2006.01)
  *C22C 38/28* (2006.01)
  *C22C 38/32* (2006.01)
  *C22C 38/38* (2006.01)
  *C21D 1/673* (2006.01)
  *C25D 5/36* (2006.01)

(52) U.S. Cl.
  CPC ......... *C21D 8/0236* (2013.01); *C21D 8/0263* (2013.01); *C21D 8/0273* (2013.01); *C21D 9/46* (2013.01); *C22C 38/00* (2013.01); *C22C 38/001* (2013.01); *C22C 38/002* (2013.01); *C22C 38/005* (2013.01); *C22C 38/02* (2013.01); *C22C 38/04* (2013.01); *C22C 38/08* (2013.01); *C22C 38/12* (2013.01); *C22C 38/14* (2013.01); *C22C 38/16* (2013.01); *C22C 38/18* (2013.01); *C22C 38/22* (2013.01); *C22C 38/28* (2013.01); *C22C 38/32* (2013.01); *C22C 38/38* (2013.01); *C23C 2/02* (2013.01); *C23C 2/06* (2013.01); *C23C 2/12* (2013.01); *C23C 2/26* (2013.01); *C23C 2/28* (2013.01); *C23C 2/405* (2013.01); *C21D 1/673* (2013.01); *C21D 2211/001* (2013.01); *C21D 2211/002* (2013.01); *C21D 2211/005* (2013.01); *C21D 2211/008* (2013.01); *C21D 2211/009* (2013.01); *C25D 5/36* (2013.01); *Y10T 428/12757* (2015.01); *Y10T 428/12799* (2015.01)

(56) References Cited

U.S. PATENT DOCUMENTS

| 2011/0146852 | A1 | 6/2011 | Matsuda et al. | |
|---|---|---|---|---|
| 2011/0240176 | A1* | 10/2011 | Kaneko | C21D 8/0463 148/503 |
| 2012/0031528 | A1 | 2/2012 | Hayashi et al. | |
| 2012/0138194 | A1 | 6/2012 | Sun | |
| 2013/0000796 | A1 | 1/2013 | Takeda et al. | |

FOREIGN PATENT DOCUMENTS

| CA | 2 862 829 A1 | 7/2013 |
|---|---|---|
| CA | 2862257 A1 | 7/2013 |
| CN | 1910301 A | 2/2007 |
| CN | 1930316 A | 3/2007 |
| CN | 101821419 | 9/2010 |
| CN | 101932746 | 12/2010 |
| CN | 102149840 | 8/2011 |
| EP | 1 666 622 A1 | 6/2006 |
| EP | 1 681 363 A1 | 7/2006 |
| EP | 2 098 600 A1 | 9/2009 |
| EP | 2 128295 A1 | 12/2009 |
| EP | 2 157 203 A1 | 2/2010 |
| EP | 2 256 224 A1 | 12/2010 |
| EP | 2 264 206 A1 | 12/2010 |
| EP | 2 312 009 A1 | 4/2011 |
| EP | 2 447 390 A1 | 5/2012 |
| JP | 06-128688 | 5/1994 |
| JP | 11-189842 | 7/1999 |
| JP | 2000-319756 | 11/2000 |
| JP | 2001-355044 | 12/2001 |
| JP | 2005-120436 | 5/2005 |
| JP | 2005-126733 | 5/2005 |
| JP | 2005-256141 | 9/2005 |
| JP | 2007-314817 | 12/2007 |
| JP | 2010-065292 | 3/2010 |
| JP | 2011052295 | * 3/2011 |
| JP | 2011-144409 | 7/2011 |
| JP | 2011-256404 | 12/2011 |
| JP | 2013-014841 | 1/2013 |
| RU | 2423532 C1 | 7/2011 |
| RU | 2439189 C1 | 1/2012 |
| TW | 201016862 A | 5/2010 |
| WO | WO 2009/090443 A1 | 7/2009 |
| WO | WO 2011/132763 A1 | 7/2010 |
| WO | WO2011/158818 | 12/2011 |

OTHER PUBLICATIONS

Office Action dated Oct. 8, 2015 issued in corresponding Korean Patent Application No. 10-2014-7019658.
Notice of Allowance dated Nov. 27, 2015 in corresponding RU Application No. 2014129486.
Office Action dated Nov. 30, 2015 in corresponding CA Application No. 2862829.
Extended European Search Report dated May 30, 2016 issued in European Patent Application No. 13736403.0.
International Search Report dated Apr. 2, 2013 issued in corresponding PCT Application No. PCT/JP2013/050385 [with English Translation].
Office Action dated Apr. 24, 2014 issued in Taiwanese Application No. 102101295 [with English Translation].
Decision on Grant issued Jan. 11, 2016. In Russian Patent Application No. 2014129323. with English Translation.
Extended European Search Report dated Apr. 25, 2016, in European Patent Application No. 13735806.5.
International Search Report dated Apr. 2, 2013, in PCT International Application No. PCT/JP2013/050405, with English translation.
Lankford et al., "The Making, Shaping, and Treating of Steel" 1985, 10th ed. pp. 1073-1075.
Mooney, Electroplated Coatings, Corrosion: Fundamentals, Testing and Protection. vol. 13A, ASM Handbook, ASM International, 2003, pp. 772-785.
Non-Final Office Action dated Mar. 21, 2017, in U.S. Appl. No. 14/370,580.
Non-Final Office Action dated Oct. 14, 2016, in U.S. Appl. No. 14/370,580.
Office Action dated Oct. 8, 2015, in Korean Patent Application No. 10-2014-7018475, with English translation.
Office Action dated Apr. 20, 2015, in Taiwan Patent Application No. 102101298, with English translation.
Office Action dated Dec. 1, 2015, in Canadian Patent Application No. 2.882.257.
Office Action dated Jul. 29, 2015, in Chinese Patent Application No. 201380005130.8.
Office Action dated Jun. 27. 2016, in Canadian Patent Application No. 2,862,257.
Restriction Requirement dated Jul. 25, 2016, in U.S. Appl. No. 14/370,580.
Notice of Allowance dated Nov. 7, 2017, in U.S. Appl. No. 14/370,580.

* cited by examiner

HOT STAMPED STEEL AND METHOD FOR PRODUCING HOT STAMPED STEEL

TECHNICAL FIELD OF THE INVENTION

The present invention relates to a hot stamped steel for which a cold rolled steel sheet for hot stamping having an excellent formability after hot stamping is used, and a method for producing the same.

This application is a national stage application of International Application No. PCT/JP2013/050385, filed Jan. 11, 2013, which claims priority to Japanese Patent Application No. 2012-004550, filed Jan. 13, 2012, each of which is incorporated by reference in its entirety.

RELATED ART

At the moment, a steel sheet for a vehicle is required to be improved in terms of collision safety and to have a reduced weight. In such a situation, hot stamping (also called hot pressing, hot stamping, diequenching, press quenching or the like) is drawing attention as a method for obtaining a high strength. The hot stamping refers to a forming method in which a steel sheet is heated at a high temperature of, for example, 700° C. or more, then hot-formed so as to improve the formability of the steel sheet, and quenched by cooling after forming, thereby obtaining desired material qualities. As described above, a steel sheet used for a body structure of a vehicle is required to have a high press workability and a high strength. A steel sheet having a ferrite and martensite structure, a steel sheet having a ferrite and bainite structure, a steel sheet containing retained austenite in a structure or the like is known as a steel sheet having both press workability and high strength. Among these steel sheets, a multi-phase steel sheet having martensite dispersed in a ferrite base has a low yield ratio and a high tensile strength, and furthermore, has excellent elongation characteristics. However, the multi-phase steel sheet has a poor hole expansibility since stress concentrates at the interface between the ferrite and the martensite, and cracking is likely to initiate from the interface.

For example, patent Documents 1 to 3 disclose the multi-phase steel sheet. In addition, Patent Documents 4 to 6 describe relationships between the hardness and formability of a steel sheet.

However, even with these techniques of the related art, it is difficult to obtain a steel sheet which satisfies the current requirements for a vehicle such as an additional reduction of the weight and more complicated shapes of a components.

PRIOR ART DOCUMENT

Patent Document

[Patent Document 1] Japanese Unexamined Patent Application, First Publication No. H6-128688
[Patent Document 2] Japanese Unexamined Patent Application, First Publication No. 2000-319756
[Patent Document 3] Japanese Unexamined Patent Application, First Publication No. 2005-120436
[Patent Document 4] Japanese Unexamined Patent Application, First Publication No. 2005-256141
[Patent Document 5] Japanese Unexamined Patent Application, First Publication No. 2001-355044
[Patent Document 6] Japanese Unexamined Patent Application, First Publication No. H11-189842

DISCLOSURE OF THE INVENTION

Problems to be Solved by the Invention

An object of the present invention is to provide a hot stamped steel, for which a cold rolled steel sheet capable of ensuring a strength and have a more favorable hole expansibility when produced into a hot stamped steel is used, and a method for producing the same hot stamped steel.

Means for Solving the Problem

The present inventors carried out intensive studies regarding a cold rolled steel sheet for hot stamping that ensured a strength after hot stamping (after quenching in a hot stamping process) and had an excellent formability (hole expansibility). As a result, it was found that, regarding the steel composition, when an appropriate relationship is established among the amount of Si, the amount of Mn and the amount of C, a fraction of a ferrite and a fraction of a martensite in the steel sheet are set to predetermined fractions, and the hardness ratio (difference of a hardness) of the martensite between a surface part of a sheet thickness and a central part of the sheet thickness of the steel sheet and the hardness distribution of the martensite in the central part of the sheet thickness are set in specific ranges, it is possible to industrially produce a cold rolled steel sheet for hot stamping capable of ensuring, in the steel sheet, a formability, that is, a characteristic of TS×λ≥50000 MPa·% that is a larger value than ever in terms of TS×λ, that is a product of a tensile strength TS and a hole expansion ratio λ. Furthermore, it was found that, when this cold rolled steel sheet is used for hot stamping, a hot stamped steel having excellent formability even after the hot stamping is obtained. In addition, it was also clarified that the suppression of a segregation of MnS in the central part of the sheet thickness of the cold rolled steel sheet for hot stamping is also effective in improving the formability (hole expansibility) of the hot stamped steel. In addition, it was also found that, in cold-rolling, an adjustment of a fraction of a cold-rolling reduction to a total cold-rolling reduction (cumulative rolling reduction) from an uppermost stand to a third stand based on the uppermost stand within a specific range is effective in controlling a hardness of the martensite. Furthermore, the inventors have found a variety of aspects of the present invention as described below. In addition, it was found that the effects are not impaired even when a hot dip galvanized layer, a galvannealed layer, an electrogalvanized layer and an aluminized layer are formed on the cold rolled steel sheet.

(1) That is, according to a first aspect of the present invention, a hot stamped steel includes, by mass %, C: 0.030% to 0.150%, Si: 0.010% to 1.00%, Mn: 1.50% to 2.70%, P: 0.001% to 0.060%, S: 0.001% to 0.010%, N: 0.0005% to 0.0100%, Al: 0.010% to 0.050%, and optionally one or more of B: 0.0005% to 0.0020%, Mo: 0.01% to 0.50%, Cr: 0.01% to 0.50%, V: 0.001% to 0.100%, Ti: 0.001% to 0.100%, Nb: 0.001% to 0.050%, Ni: 0.01% to 1.00%, Cu: 0.01% to 1.00%, Ca: 0.0005% to 0.0050%, REM: 0.00050% to 0.0050%, and a balance including Fe and unavoidable impurities, in which, when [C] represents an amount of C by mass %, [Si] represents an amount of Si by mass %, and [Mn] represents an amount of Mn by mass %, a following expression (A) is satisfied, a metallographic structure after a hot stamping includes 40% to 90% of a ferrite and 10% to 60% of a martensite in an area fraction, a total of an area fraction of the ferrite and an area fraction of the martensite is 60% or more, the metallographic structure may optionally further includes one or more of 10% or less of a perlite in an area fraction, 5% or less of a retained austenite in a volume ratio, and less than 40% of a bainite as a remainder in an area fraction, a hardness of the martensite measured with a nanoindenter satisfies a following expression (B) and a following expression (C), TS×λ, which is a product of a tensile strength TS and a hole expansion ratio λ is 50000 MPa·% or more, $$(5\times[Si]+[Mn])/[C]>11 \quad (A),$$

$$H2/H1<1.10 \quad (B),$$

$$\sigma HM<20 \quad (C), \text{ and}$$

the H1 is an average hardness of the martensite in a surface part of a sheet thickness after the hot stamping, the H2 is an average hardness of the martensite in a central part of the sheet thickness which is an area having a width of 200 μm in a thickness direction at a center of the sheet thickness after the hot stamping, and the σHM is a variance of the average hardness of the martensite in the central part of the sheet thickness after the hot stamping.

(2) In the hot stamped steel according to the above (1), an area fraction of MnS existing in the hot stamped steel and having an equivalent circle diameter of 0.1 μm to 10 μm may be 0.01% or less, and a following expression (D) may be satisfied, $$n2/n1<1.5 \quad (D), \text{ and}$$

the n1 is an average number density per 10000 μm² of the MnS having the equivalent circle diameter of 0.1 μm to 10 μm in a ¼ part of the sheet thickness after the hot stamping, and the n2 is an average number density per 10000 μm² of the MnS having the equivalent circle diameter of 0.1 μm to 10 μm in the central part of the sheet thickness after the hot stamping.

(3) In the hot stamped steel according to the above (1) or (2), a hot dip galvanizing may be formed on a surface thereof.

(4) In the hot stamped steel according to the above (3), a galvannealing may be formed on a surface of the hot dip galvanizing.

(5) In the hot stamped steel according to the above (1) or (2), an electrogalvanizing may be formed on a surface thereof.

(6) In the hot stamped steel according to the above (1) or (2), an aluminizing may be formed on a surface thereof.

(7) According to another aspect of the present invention, there is provided a method for producing a hot stamped steel including casting a molten steel having a chemical composition according to the above (1) and obtaining a steel, heating the steel, hot-rolling the steel with a hot-rolling mill including a plurality of stands, coiling the steel after the hot-rolling, pickling the steel after the coiling, cold-rolling the steel with a cold-rolling mill including a plurality of stands after the pickling under a condition satisfying a following expression (E), annealing in which the steel is annealed under 700° C. to 850° C. and cooled after the cold-rolling, temper-rolling the steel after cooled following annealed, and hot stamping in which the steel is heated to a temperature range of 700° C. to 1000° C. after the temper-rolling, hot-stamped within the temperature range, and thereafter cooled to a room temperature or more and 300° C. or less, $$1.5\times r1/r+1.2\times r2/r+r3/r>1.0 \quad (E), \text{ and}$$

the ri (i=1, 2, 3) represents an individual target cold-rolling reduction at an ith stand (i=1, 2, 3) based on an uppermost stand in the plurality of stands in the cold-rolling in unit %, and the r represents a total cold-rolling reduction in the cold-rolling in unit %.

(8) In the method for producing the hot stamped steel according to the above (7), when CT represents a coiling temperature in the coiling in unit ° C., [C] represents the amount of C by mass %, [Mn] represents the amount of Mn by mass %, [Si] represents the amount of Si by mass %, and [Mo] represents the amount of Mo by mass % in the steel sheet, a following expression (F) may be satisfied, $$560-474\times[C]-90\times[Mn]-20\times[Cr]-20\times[Mo]$$
$$<CT<830-270\times[C]-90\times[Mn]-70\times[Cr]-80\times[Mo] \quad (F).$$

(9) In the method for producing the hot stamped steel according to the above (7) or (8), when T represents a heating temperature in the heating in unit ° C., t represents an in-furnace time in the heating in unit minute, [Mn] represents the amount of Mn by mass %, and [S] represents an amount of S by mass % in the steel sheet, a following expression (G) may be satisfied, $$T\times\ln(t)/(1.7\times[Mn]+[S])>1500 \quad (G).$$

(10) The method for producing the hot stamped steel according to any one of the above (7) to (9) may further include galvanizing the steel between the annealing and the temper-rolling.

(11) The method for producing the hot stamped steel according to the above (10) may further include alloying the steel between the galvanizing and the temper-rolling.

(12) The method for producing the hot stamped steel according to any one of the above (7) to (9) may further include electrogalvanizing the steel after the temper-rolling.

(13) The method for producing the hot stamped steel according to any one of the above (7) to (9) may further include aluminizing the steel between the annealing and the temper-rolling.

Effects of the Invention

According to the above-described aspect of the present invention, since an appropriate relationship is established among the amount of C, the amount of Mn and the amount of Si, and, even in the hot stamped steel, the hardness of the martensite measured with a nanoindenter is set to an appropriate value, it is possible to obtain a more favorable hole expansibility in the hot stamped steel.

EMBODIMENTS OF THE INVENTION

Figure 1:
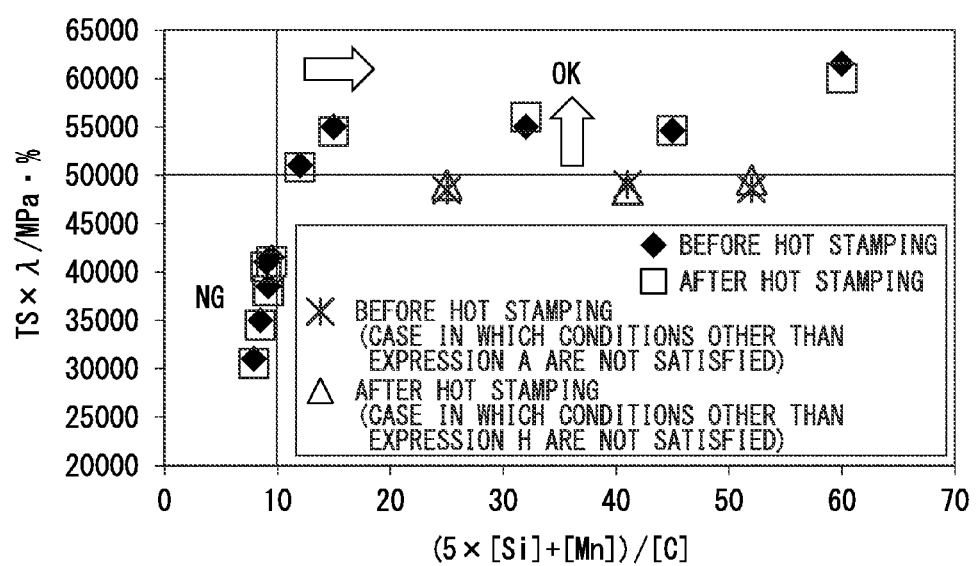
FIG. 1 is a graph illustrating the relationship between $(5\times[Si]+[Mn])/[C]$ and TS×λ in a cold rolled steel sheet for hot stamping before hot stamping and a hot stamped steel.

As described above, it is important to establish an appropriate relationship among the amount of Si, the amount of Mn and the amount of C and provide an appropriate hardness to a martensite in a predetermined position in a steel sheet in order to improve formability (hole expansibility). Thus far, there have been no studies regarding the relationship between the formability or the hardness of the martensite in a hot stamped steel.

Herein, reasons for limiting a chemical composition of a hot stamped steel for which a cold rolled steel sheet for hot stamping is used according to an embodiment of the present invention (in some cases, also referred to as a hot stamped steel for which a cold rolled steel sheet for hot stamping is used according to the present embodiment) and steel used for manufacture thereof will be described. Hereinafter, "%" that is a unit of an amount of an individual component indicates "mass %".

C: 0.030% to 0.150%

C is an important element to strengthen the martensite and increase the strength of the steel. When the amount of C is less than 0.030%, it is not possible to sufficiently increase the strength of the steel. On the other hand, when the amount of C exceeds 0.150%, degradation of the ductility (elongation) of the steel becomes significant. Therefore, the range of the amount of C is set to 0.030% to 0.150%. In a case in which there is a demand for high hole expansibility, the amount of C is desirably set to 0.100% or less.

Si: 0.010% to 1.000%

Si is an important element for suppressing a formation of a harmful carbide and obtaining a multi-phase structure mainly including a ferrite structure and a balance of the martensite. However, in a case in which the amount of Si exceeds 1.0%, the elongation or hole expansibility of the steel degrades, and a chemical conversion treatment property also degrades. Therefore, the amount of Si is set to 1.000% or less. In addition, while the Si is added for deoxidation, a deoxidation effect is not sufficient when the amount of Si is less than 0.010%. Therefore, the amount of Si is set to 0.010% or more.

Al: 0.010% to 0.050%

Al is an important element as a deoxidizing agent. To obtain the deoxidation effect, the amount of Al is set to 0.010% or more. On the other hand, even when the Al is excessively added, the above-described effect is saturated, and conversely, the steel becomes brittle. Therefore, the amount of Al is set in a range of 0.010% to 0.050%.

Mn: 1.50% to 2.70%

Mn is an important element for increasing a hardenability of the steel and strengthening the steel. However, when the amount of Mn is less than 1.50%, it is not possible to sufficiently increase the strength of the steel. On the other hand, when the amount of Mn exceeds 2.70%, since the hardenability increases more than necessary, an increase in the strength of the steel is caused, and consequently, the elongation or hole expansibility of the steel degrades. Therefore, the amount of Mn is set in a range of 1.50% to 2.70%. In a case in which there is a demand for high elongation, the amount of Mn is desirably set to 2.00% or less.

P: 0.001% to 0.060%

In a case in which the amount is large, P segregates at a grain boundary, and deteriorates the local ductility and weldability of the steel. Therefore, the amount of P is set to 0.060% or less. On the other hand, since an unnecessary decrease of P leads to an increasing in the cost of refining, the amount of P is desirably set to 0.001% or more.

S: 0.001% to 0.010%

S is an element that forms MnS and significantly deteriorates the local ductility or weldability. Therefore, the upper limit of the amount of S is set to 0.010%. In addition, in order to reduce refining costs, a lower limit of the amount of S is desirably set to 0.001%.

N: 0.0005% to 0.0100%

N is an important element to precipitate MN and the like and miniaturize crystal grains. However, when the amount of N exceeds 0.0100%, a N solid solution (nitrogen solid solution) remains and the ductility of the steel is degraded. Therefore, the amount of N is set to 0.0100% or less. Due to a problem of refining costs, the lower limit of the amount of N is desirably set to 0.0005%.

The hot stamped steel for which the cold rolled steel sheet for hot stamping is used according to the embodiment has a basic composition including the above-described components, Fe as a balance and unavoidable impurities, but may further contain any one or more elements of Nb, Ti, V, Mo, Cr, Ca, REM (rare earth metal), Cu, Ni and B as elements that have thus far been used in amounts that are equal to or less than the below-described upper limits to improve the strength, to control a shape of a sulfide or an oxide, and the like. Since these chemical elements are not necessarily added to the steel sheet, the lower limits thereof are 0%.

Nb, Ti and V are elements that precipitate a fine carbonitride and strengthen the steel. In addition, Mo and Cr are elements that increase hardenability and strengthen the steel. To obtain these effects, it is desirable to contain Nb: 0.001% or more, Ti: 0.001% or more, V: 0.001% or more, Mo: 0.01% or more, and Cr: 0.01% or more. However, even when Nb: more than 0.050%, Ti: more than 0.100%, V: more than 0.100%, Mo: more than 0.50%, and Cr: more than 0.50% are contained, the strength-increasing effect is saturated, and there is a concern that the degradation of the elongation or the hole expansibility may be caused.

The steel may further contain Ca in a range of 0.0005% to 0.0050%. Ca and rare earth metal (REM) control the shape of the sulfide or the oxide and improve the local ductility or the hole expansibility. To obtain this effect using the Ca, it is preferable to add 0.0005% or more of the Ca. However, since there is a concern that an excessive addition may deteriorate workability, an upper limit of the amount of Ca is set to 0.0050%. For the same reason, for the rare earth metal (REM) as well, it is preferable to set the lower limit of the amount to 0.0005% and the upper limit of the amount to 0.0050%.

The steel may further contain Cu: 0.01% to 1.00%, Ni: 0.01% to 1.00% and B: 0.0005% to 0.0020%. These elements also can improve the hardenability and increase the strength of the steel. However, to obtain the effect, it is preferable to contain Cu: 0.01% or more, Ni: 0.01% or more and B: 0.0005% or more. In a case in which the amounts are equal to or less than the above-described values, the effect that strengthens the steel is small. On the other hand, even when Cu: more than 1.00%, Ni: more than 1.00% and B: more than 0.0020% are added, the strength-increasing effect is saturated, and there is a concern that the ductility may degrade.

In a case in which the steel contains B, Mo, Cr, V, Ti, Nb, Ni, Cu, Ca and REM, one or more elements are contained. The balance of the steel is composed of Fe and unavoidable impurities. Elements other than the above-described elements (for example, Sn, As and the like) may be further contained as unavoidable impurities as long as the elements do not impair characteristics. Furthermore, when B, Mo, Cr, V, Ti, Nb, Ni, Cu, Ca and REM are contained in amounts that are less than the above-described lower limits, the elements are treated as unavoidable impurities.

In addition, in the hot stamped steel for which the cold rolled steel sheet for hot stamping is used according to the embodiment, as illustrated in FIG. 1, when the amount of C (mass %), the amount of Si (mass %) and the amount of Mn (mass %) are represented by [C], [Si] and [Mn] respectively, it is important to satisfy a following expression (A).

$$(5\times[Si]+[Mn])/[C]>11 \tag{A}$$

To satisfy a condition of TS×λ≥50000 MPa·%, the above expression (A) is preferably satisfied. When the value of $(5\times[Si]+[Mn])/[C]$ is 11 or less, it is not possible to obtain a sufficient hole expansibility. This is because, when the amount of C is large, the hardness of a hard phase becomes too high, a hardness difference (ratio of the hardness) between the hard phase and a soft phase becomes great, and therefore the λ value deteriorates, and, when the amount of Si or the amount of Mn is small, TS becomes low. Regarding the value of $(5\times[Si]+[Mn])/[C]$, since the value does not change even after hot stamping as described above, the expression is preferably satisfied during a production of the metal sheet.

Figure 2A:
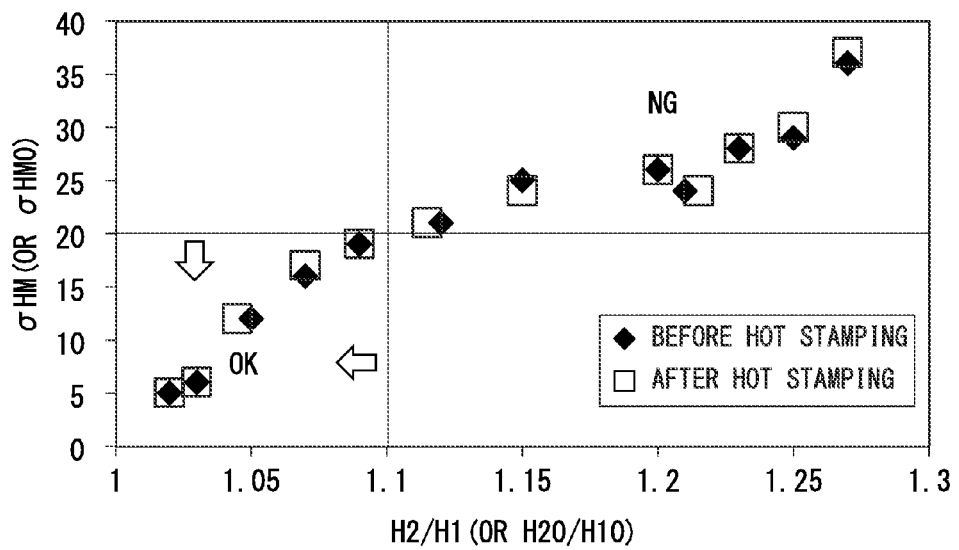
FIG. 2A is a graph illustrating a foundation of an expression (B) and is a graph illustrating the relationship between an H20/H10 and σHM0 in the cold rolled steel sheet for hot stamping before hot stamping and the relationship between H2/H1 and σHM in the hot stamped steel.
Figure 2B:
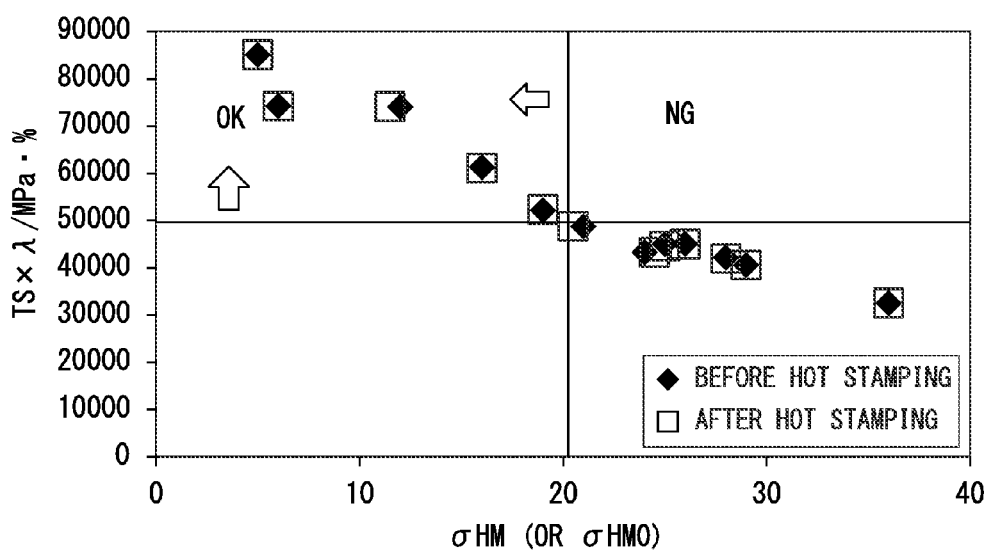
FIG. 2B is a graph illustrating a foundation of an expression (C) and is a graph illustrating the relationship between σHM0 and TS×λ in the cold rolled steel sheet for hot stamping before hot stamping and the relationship between σHM and TS×λ in the hot stamped steel.

Generally, it is the martensite rather than the ferrite to dominate the formability (hole expansibility) in a dual-phase steel (DP steel). As a result of intensive studies by the inventors regarding the hardness of martensite, it was clarified that, when the hardness difference (the ratio of the hardness) of the martensite between a surface part of a sheet thickness and a central part of the sheet thickness, and the hardness distribution of the martensite in the central part of the sheet thickness are in a predetermined state in a phase of before hot stamping (before heating for carrying out quenching in a hot stamping process), the state is almost maintained even after hot stamping as illustrated in FIGS. 2A and 2B, and the formability such as elongation or hole expansibility becomes favorable. This is considered to be because the hardness distribution of the martensite formed before hot stamping still has a significant effect even after hot stamping, and alloy elements concentrated in the central part of the sheet thickness still hold a state of being concentrated in the central part of the sheet thickness even after hot stamping. That is, in the steel sheet before hot stamping, in a case in which the hardness ratio between the martensite in the surface part of the sheet thickness and the martensite in the central part of the sheet thickness is great, or a variance of the hardness of the martensite is great, the same tendency is exhibited even after hot stamping. As illustrated in FIGS. 2A and 2B, the hardness ratio between the surface part of the sheet thickness and the central part of the sheet thickness in the cold rolled steel sheet for hot stamping for the hot stamped steel according to the embodiment before hot stamping and the hardness ratio between the surface part of the sheet thickness and the central part of the sheet thickness in the hot stamped steel, for which the cold rolled steel sheet for hot stamping is used according to the embodiment, are almost the same. In addition, similarly, the variance of the hardness of the martensite in the central part of the sheet thickness in the cold rolled steel sheet for hot stamping for the hot stamped steel according to the embodiment before hot stamping and the variance of the hardness of the martensite in the central part of the sheet thickness in the hot stamped steel, for which the cold rolled steel sheet for hot stamping is used according to the embodiment, are almost the same. Therefore, the formability of the cold rolled steel sheet for a hot stamping for the hot stamped steel according to the embodiment is similarly excellent to the formability of the hot stamped steel for which the cold rolled steel sheet for hot stamping is used according to the embodiment.

In addition, regarding the hardness of the martensite measured with an nanoindenter manufactured by Hysitron Corporation at a magnification of 1000 times, the inventors found that a following expression (B) and a following expression (C) ((H) and (I) as well) being satisfied are advantageous to the formability of the hot stamped steel. Here, "H1" is the average hardness of the martensite in the surface part of the sheet thickness that is within an area having a width of 200 μm in a thickness direction from an outermost layer of the steel sheet in the thickness direction in the hot stamped steel, "H2" is the average hardness of the martensite in an area having a width of ±100 μm in the thickness direction from the central part of the sheet thickness in the central part of the sheet thickness in the hot stamped steel, and "σHM" is the variance of the hardness of the martensite in an area having a width of ±100 μm in the thickness direction from the central part of the sheet thickness in the hot stamped steel. In addition, "H10" is the hardness of the martensite in the surface part of the sheet thickness in the cold rolled steel sheet for hot stamping before hot stamping, "H20" is the hardness of the martensite in the central part of the sheet thickness, that is, in an area having a width of 200 μm in the thickness direction in a center of the sheet thickness in the cold rolled steel sheet for hot stamping before hot stamping, and "σHM0" is the variance of the hardness of the martensite in the central part of the sheet thickness in cold rolled steel sheet for hot stamping before hot stamping. The H1, H10, H2, H20, σHM and σHM0 are obtained respectively from 300-point measurements for each. An area having a width of ±100 μm in the thickness direction from the central part of the sheet thickness refers to an area having a center at the center of the sheet thickness and having a dimension of 200 μm in the thickness direction.

$$H2/H1<1.10 \tag{B}$$

$$\sigma HM<20 \tag{C}$$

$$H20/H10<1.10 \tag{H}$$

$$\sigma HM0<20 \tag{I}$$

In addition, here, the variance is a value obtained using a following expression (K) and indicating a distribution of the hardness of the martensite.

$$\sigma HM = \frac{1}{n}\sum_{i=1}^{n}(x_{ave} - x_i)^2 \ldots (K)$$ [Expression 1]

$x_{ave}$ represents the average value of the hardness, and $x_i$ represents an $i^{th}$ hardness.

A value of H2/H1 of 1.10 or more represents that the hardness of the martensite in the central part of the sheet thickness is 1.10 or more times the hardness of the martensite in the surface part of the sheet thickness, and, in this case, σHM becomes 20 or more even after hot stamping as illustrated in FIG. 2A. When the value of the H2/H1 is 1.10 or more, the hardness of the central part of the sheet thickness becomes too high, TS×λ becomes less than 50000 MPa·% as illustrated in FIG. 2B, and a sufficient formability cannot be obtained both before quenching (that is, before hot stamping) and after quenching (that is, after hot stamping). Furthermore, theoretically, there is a case in which the lower limit of the H2/H1 becomes the same in the central part of the sheet thickness and in the surface part of the sheet thickness unless a special thermal treatment is carried out; however, in an actual production process, when considering productivity, the lower limit is, for example, up to approximately 1.005. What has been described above regarding the value of H2/H1 shall also apply in a similar manner to the value of H20/H10.

In addition, the variance σHM being 20 or more even after hot stamping indicates that a scattering of the hardness of the martensite is large, and parts in which the hardness is too high locally exist. In this case, TS×λ becomes less than 50000 MPa·% as illustrated in FIG. 2B, and a sufficient formability of the hot stamped steel cannot be obtained. What has been described above regarding the value of the σHM shall also apply in a similar manner to the value of the σHM0.

In the hot stamped steel according to the embodiment, the area fraction of the ferrite in a metallographic structure after hot stamping is 40% to 90%. When the area fraction of the ferrite is less than 40%, a sufficient elongation or a sufficient hole expansibility cannot be obtained. On the other hand, when the area fraction of the ferrite exceeds 90%, the martensite becomes insufficient, and a sufficient strength cannot be obtained. Therefore, the area fraction of the ferrite in the hot stamped steel is set to 40% to 90%. In addition, the metallographic structure of the hot stamped steel also includes the martensite, an area fraction of the martensite is 10% to 60%, and a total of the area fraction of the ferrite and the area fraction of the martensite is 60% or more. All or principal parts of the metallographic structure of the hot stamped steel are occupied by the ferrite and the martensite, and furthermore, one or more of a pearlite, a bainite as remainder and a retained austenite may be included in the metallographic structure. However, when the retained austenite remains in the metallographic structure, a secondary working brittleness and a delayed fracture characteristic are likely to degrade. Therefore, it is preferable that the retained austenite is substantially not included; however, unavoidably, 5% or less of the retained austenite in a volume ratio may be included. Since the pearlite is a hard and brittle structure, it is preferable not to include the pearlite in the metallographic structure; however, unavoidably, up to 10% of the pearlite in an area fraction may be included. Furthermore, the amount of the bainite as remainder is preferably 40% or less in an area fraction with respect to a region excluding the ferrite and the martensite. Here, the metallographic structures of the ferrite, the bainite as remainder and the pearlite were observed through Nital etching, and the metallographic structure of the martensite was observed through Le pera etching. In both cases, a ¼ part of the sheet thickness was observed at a magnification of 1000 times. The volume ratio of the retained austenite was measured with an X-ray diffraction apparatus after polishing the steel sheet up to the ¼ part of the sheet thickness. The ¼ part of the sheet thickness refers to a part ¼ of the thickness of the steel sheet away from a surface of the steel sheet in a thickness direction of the steel sheet in the steel sheet.

In the embodiment, the hardness of the martensite measured at a magnification of 1000 times is specified by using a nanoindenter. Since an indentation formed in an ordinary Vickers hardness test is larger than the martensite, according to the Vickers hardness test, while a macroscopic hardness of the martensite and peripheral structures thereof (ferrite and the like) can be obtained, it is not possible to obtain the hardness of the martensite itself. Since the formability (hole expansibility) is significantly affected by the hardness of the martensite itself, it is difficult to sufficiently evaluate the formability only with a Vickers hardness. On the contrary, in the embodiment, since an appropriate relationship of the hardness of the martensite in the hot stamped steel measured with the nanoindenter is provided, it is possible to obtain an extremely favorable formability.

Figure 3:
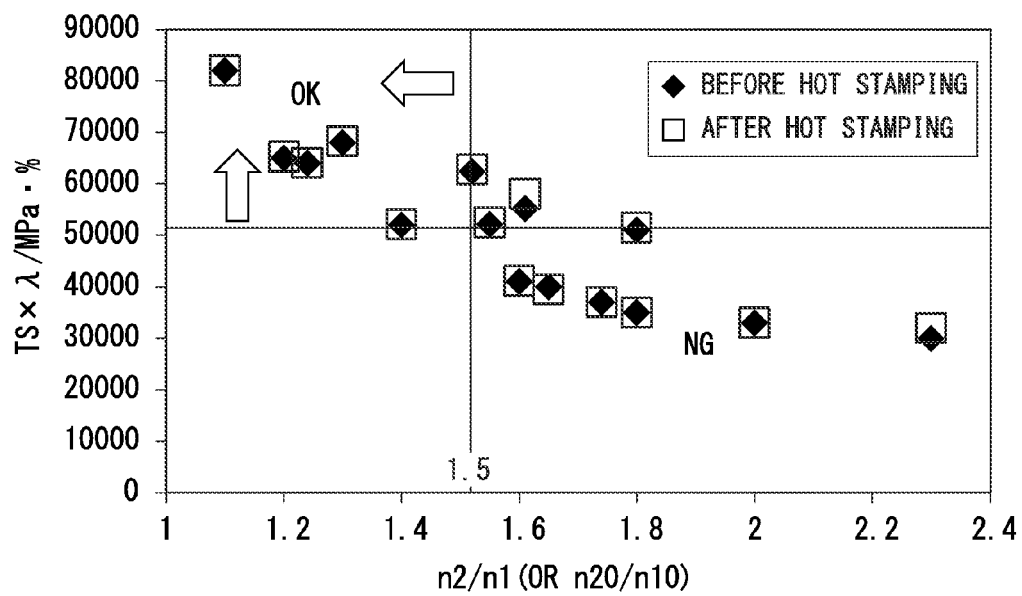
FIG. 3 is a graph illustrating the relationship between n20/n10 and TS×λ in the cold rolled steel sheet for hot stamping before hot stamping and the relationship between n2/n1 and TS×λ in the hot stamped steel and illustrating a foundation of an expression (D).

In addition, in the cold rolled steel sheet for hot stamping before hot stamping and the hot stamped steel, as a result of observing MnS at a location of ¼ of the sheet thickness and in the central part of the sheet thickness, it was found that it is preferable that an area fraction of the MnS having an equivalent circle diameter of 0.1 μm to 10 μm is 0.01% or less, and, as illustrated in FIG. 3, a following expression (D) ((J) as well) is satisfied in order to favorably and stably satisfy the condition of TS×λ≥50000 MPa·%. When the MnS having an equivalent circle diameter of 0.1 μm or more exists during a hole expansibility test, since stress concentrates in the vicinity thereof, cracking is likely to occur. A reason for not counting the MnS having the equivalent circle diameter of less than 0.1 μm is that an effect on the stress concentration is small. In addition, a reason for not counting the MnS having the equivalent circle diameter of more than 10 μm is that, the MnS having the above-described grain size is included in the steel sheet, the grain size is too large, and the steel sheet becomes unsuitable for working. Furthermore, when the area fraction of the MnS having the equivalent circle diameter of 0.1 μm to 10 μm exceeds 0.01%, since it becomes easy for fine cracks generated due to the stress concentration to propagate, the hole expansibility further deteriorates, and there is a case in which the condition of TS×λ≥50000 MPa·% is not satisfied. Here, "n1" and "n10" are number densities of the MnS having the equivalent circle diameter of 0.1 μm to 10 μm at the ¼ part of the sheet thickness in the hot stamped steel and the cold rolled steel sheet before hot stamping respectively, and "n2" and "n20" are number densities of the MnS having the equivalent circle diameter of 0.1 μm to 10 μm at the central part of the sheet thickness in the hot stamped steel and the cold rolled steel sheet before hot stamping respectively.

$n2/n1<1.5$ (D)

$n20/n10<1.5$ (J)

These relationships are all identical to the steel sheet before hot stamping, the steel sheet after hot stamping, and the hot stamped steel.

When the area fraction of the MnS having the equivalent circle diameter of 0.1 μm to 10 μm is more than 0.01% after hot stamping, the formability is likely to degrade. The lower limit of the area fraction of the MnS is not particularly specified, however, 0.0001% or more of the MnS is present due to a below-described measurement method, a limitation of a magnification and a visual field, and an original amount of Mn or the S. In addition, a value of an n2/n1 (or an n20/n10) being 1.5 or more represents that a number density of the MnS having the equivalent circle diameter of 0.1 μm to 10 μm in the central part of the sheet thickness of the hot stamped steel (or the cold rolled steel sheet for hot stamping before hot stamping) is 1.5 or more times the number density of the MnS having the equivalent circle diameter of 0.1 μm to 10 μm in the ¼ part of the sheet thickness of the hot stamped steel (or the cold rolled steel sheet for hot stamping before hot stamping). In this case, the formability is likely to degrade due to a segregation of the MnS in the central part of the sheet thickness of the hot stamped steel (or the cold rolled steel sheet for hot stamping before hot stamping). In the embodiment, the equivalent circle diameter and number density of the MnS having the equivalent circle diameter of 0.1 μm to 10 μm were measured with a field emission scanning electron microscope (Fe-SEM) manufactured by JEOL Ltd. At a measurement, a magnification was 1000 times, and a measurement area of the visual field was set to $0.12 \times 0.09$ mm$^2$ ($=10800$ μm$^2 \approx 10000$ μm$^2$). Ten visual fields were observed in the ¼ part of the sheet thickness, and ten visual fields were observed in the central part of the sheet thickness. The area fraction of the MnS having the equivalent circle diameter of 0.1 μm to 10 μm was computed with particle analysis software. In the hot stamped steel for which the cold rolled steel sheet for hot stamping is used according to the embodiment, the form (shape and number) of the MnS formed before hot stamping is the same before and after hot stamping. FIG. 3 is a view illustrating a relationship between the n2/n1 and TS×λ after hot stamping and a relationship between an n20/n10 and TS×λ before hot stamping, and, according to FIG. 3, the n20/n10 of the cold rolled steel sheet before hot stamping and the n2/n1 of the hot stamped steel are almost the same. This is because the form of the MnS does not change at a heating temperature of a hot stamping, generally.

When the hot stamping is carried out on the steel sheet having the above-described configuration, it is possible to realize a tensile strength of 500 MPa to 1500 MPa, and a significant formability-improving effect is obtained in the hot stamped steel having the tensile strength of approximately 550 MPa to 1200 MPa.

Furthermore, it is preferable to form a galvanizing, a galvannealing, an electrogalvanizing or an aluminizing on a surface of the hot stamped steel for which the cold rolled steel sheet for hot stamping is used according to the embodiment in terms of rust prevention. A formation of the above-described platings does not impair the effects of the embodiment. The above-described platings can be carried out with a well-known method.

Hereinafter, a method for producing the hot stamped steel for which the cold rolled steel sheet (a cold rolled steel sheet, a galvanized cold rolled steel sheet, a galvannealed cold rolled steel sheet, an electrogalvannealed cold rolled steel sheet and an aluminized cold rolled steel sheet) for hot stamping is used according to the embodiment will be described.

When producing the hot stamped steel for which the cold rolled steel sheet for hot stamping is used according to the embodiment, as an ordinary condition, a molten steel from a melting process in a converter is continuously cast, thereby producing a slab. In the continuous casting, when a casting rate is fast, a precipitate of Ti and the like becomes too fine, and, when the casting rate is slow, a productivity deteriorates, and consequently, a metallographic structure of the above-described precipitate coarsens and the number of particles in the metallographic structure decreases, and thus, there is a case other characteristics such as a delayed fracture cannot be controlled. Therefore, the casting rate is desirably 1.0 m/minute to 2.5 m/minute.

The slab after the casting can be subjected to hot-rolling as it is. Alternatively, in a case in which the slab after cooling has been cooled to less than 1100° C., it is possible to reheat the slab after cooling to 1100° C. to 1300° C. in a tunnel furnace or the like and subject the slab to hot-rolling. When a slab temperature is less than 1100° C., it is difficult to ensure a finishing temperature in the hot-rolling, which causes a degradation of the elongation. In addition, in the hot stamped steel for which a steel sheet for hot stamping to which Ti and Nb are added is used, since a dissolution of the precipitate becomes insufficient during the heating, which causes a decrease in a strength. On the other hand, when the heating temperature is more than 1300° C., a generation of a scale becomes great, and there is a case in which it is not possible to make favorable a surface property of the hot stamped steel for which the cold rolled steel sheet for hot stamping is used.

Figure 6:
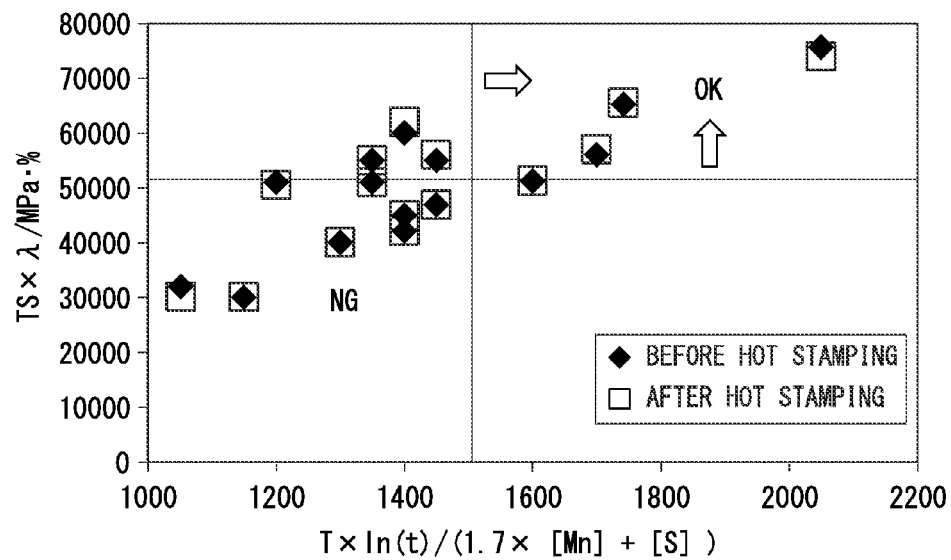
FIG. 6 is a graph illustrating the relationship between T×ln(t)/(1.7×[Mn]+[S]) and TS×λ, and illustrating a foundation of an expression (G).

In addition, to decrease the area fraction of the MnS having the equivalent circle diameter of 0.1 μm to 10 μm, when the amount of Mn and the amount of S in the steel are respectively represented by [Mn] and [S] by mass %, it is preferable for a temperature T (° C.) of a heating furnace before carrying out hot-rolling, an in-furnace time t (minutes), [Mn] and [S] to satisfy a following expression (G) as illustrated in FIG. 6.

$$T \times \ln(t)/(1.7 \times [Mn]+[S]) > 1500 \tag{G}$$

When T×ln(t)/(1.7×[Mn]+[S]) is equal to or less than 1500, the area fraction of the MnS having the equivalent circle diameter of 0.1 μm to 10 μm becomes large, and there is a case in which a difference between the number density of the MnS having the equivalent circle diameter of 0.1 μm to 10 μm in the ¼ part of the sheet thickness and the number density of the MnS having the equivalent circle diameter of 0.1 μm to 10 μm in the central part of the sheet thickness becomes large. The temperature of the heating furnace before carrying out hot-rolling refers to an extraction temperature at an outlet side of the heating furnace, and the in-furnace time refers to a time elapsed from an insertion of the slab into the hot heating furnace to an extraction of the slab from the heating furnace. Since the MnS does not change even after hot stamping as described above, it is preferable to satisfy the expression (G) in a heating process before hot-rolling.

Next, the hot-rolling is carried out according to a conventional method. At this time, it is desirable to carry out hot-rolling on the slab at the finishing temperature (the hot-rolling end temperature) which is set in a range of an Ar$_3$ temperature to 970° C. When the finishing temperature is less than the Ar$_3$ temperature, the hot-rolling becomes a (α+γ) two-phase region rolling (two-phase region rolling of the ferrite+the martensite), and there is a concern that the elongation may degrade. On the other hand, when the finishing temperature exceeds 970° C., an austenite grain size coarsens, and the fraction of the ferrite becomes small, and thus, there is a concern that the elongation may degrade. A hot-rolling facility may have a plurality of stands.

Here, the $Ar_3$ temperature was estimated from an inflection point of a length of a test specimen after carrying out a formastor test.

After the hot-rolling, the steel is cooled at an average cooling rate of 20° C./second to 500° C./second, and is coiled at a predetermined coiling temperature CT. In a case in which the average cooling rate is less than 20° C./second, the pearlite that causes the degradation of the ductility is likely to be formed. On the other hand, an upper limit of the cooling rate is not particularly specified and is set to approximately 500° C./second in consideration of a facility specification, but is not limited thereto.

Figure 4:
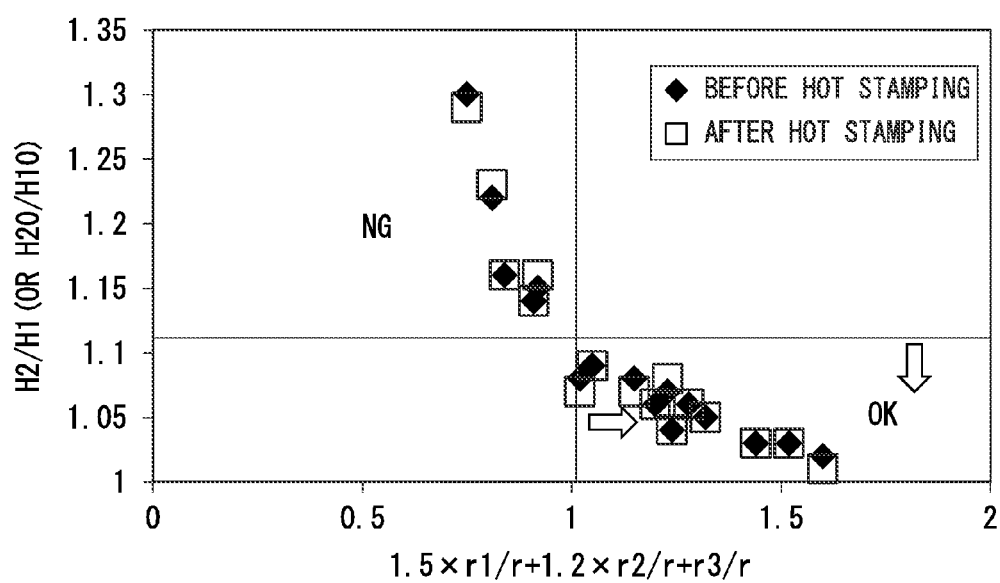
FIG. 4 is a graph illustrating the relationship between 1.5×r1/r+1.2×r2/r+r3/r and H20/H10 in the cold rolled steel sheet for hot stamping before hot stamping and the relationship between 1.5×r1/r+1.2×r2/2+r3/r and H2/H1 in the hot stamped steel, and illustrating a foundation of an expression (E).

After the coiling, pickling is carried out, and cold-rolling is carried out. At this time, to obtain a range satisfying the above-described expression (C) as illustrated in FIG. 4, the cold-rolling is carried out under a condition in which a following expression (E) is satisfied. When conditions for annealing, cooling and the like described below are further satisfied after the above-described rolling, TS×λ≥50000 MPa·% is ensured in the cold rolled steel sheet for hot stamping before hot stamping and/or the hot stamped steel. From the viewpoint of the productivity, the cold-rolling is desirably carried out with a tandem rolling mill in which a plurality of rolling mills are linearly disposed, and the steel sheet is continuously rolled in a single direction, thereby obtaining a predetermined thickness.

$$1.5 \times r1/r + 1.2 \times r2/r + r3/r > 1.0 \quad (E)$$

Here, the "ri" represents an individual target cold-rolling reduction (%) at an $i^{th}$ stand (i=1, 2, 3) from an uppermost stand in the cold-rolling, and the "r" represents a total target cold-rolling reduction (%) in the cold-rolling. The total cold-rolling reduction is a so-called cumulative reduction, and on a basis of the sheet thickness at an inlet of a first stand, is a percentage of the cumulative reduction (a difference between the sheet thickness at the inlet before a first pass and the sheet thickness at an outlet after a final pass) with respect to the above-described basis.

When the cold-rolling is carried out under the conditions in which the expression (E) is satisfied, it is possible to sufficiently divide the pearlite in the cold-rolling even when a large pearlite exists before the cold-rolling. As a result, it is possible to burn the pearlite or suppress the area fraction of the pearlite to a minimum through the annealing carried out after cold-rolling, and therefore it becomes easy to obtain a structure in which an expression (B) and an expression (C) are satisfied. On the other hand, in a case in which the expression (E) is not satisfied, the cold-rolling reductions in upper stream stands are not sufficient, the large pearlite is likely to remain, and it is not possible to form a desired martensite in the following annealing. In addition, the inventors found that, when the expression (E) is satisfied, an obtained form of the martensite structure after the annealing is maintained in almost the same state even after hot stamping is carried out, and therefore the hot stamped steel for which the cold rolled steel sheet for hot stamping is used according to the embodiment becomes advantageous in terms of the elongation or the hole expansibility even after hot stamping. In a case in which the hot stamped steel for which the cold rolled steel sheet for hot stamping is used according to the embodiment is heated up to the two-phase region in the hot stamping, a hard phase including the martensite before hot stamping turns into an austenite structure, and the ferrite before hot stamping remains as it is. Carbon (C) in the austenite does not move to the peripheral ferrite. After that, when cooled, the austenite turns into a hard phase including the martensite. That is, when the expression (E) is satisfied and the above-described H2/H1 (or H20/H10) is in a predetermined range, the H2/H1 is maintained even after hot stamping and hot stamped steel becomes excellent in terms of the formability.

In the embodiment, r, r1, r2 and r3 are the target cold-rolling reductions. Generally, the cold-rolling is carried out while controlling the target cold-rolling reduction and an actual cold-rolling reduction to become substantially the same value. It is not preferable to carry out the cold-rolling in a state in which the actual cold-rolling reduction is unnecessarily made to be different from the target cold-rolling reduction. However, in a case in which there is a large difference between a target rolling reduction and an actual rolling reduction, it is possible to consider that the embodiment is carried out when the actual cold-rolling reduction satisfies the expression (E). Furthermore, the actual cold-rolling reduction is preferably within ±10% of the cold-rolling reduction.

After cold-rolling, a recrystallization is caused in the steel sheet by carrying out the annealing. The annealing forms a desired martensite. Furthermore, regarding an annealing temperature, it is preferable to carry out the annealing by heating the steel sheet to 700° C. to 850° C., and cool the steel sheet to a room temperature or a temperature at which a surface treatment such as the galvanizing is carried out. When the annealing is carried out in the above-described range, it is possible to stably ensure a predetermined area fraction of the ferrite and a predetermined area fraction of the martensite, to stably set a total of the area fraction of the ferrite and the area fraction of the martensite to 60% or more, and to contribute to an improvement of TS×λ. Other annealing conditions are not particularly specified, but a holding time at 700° C. to 850° C. is preferably 1 second or more as long as the productivity is not impaired to reliably obtain a predetermined structure, and it is also preferable to appropriately determine a temperature-increase rate in a range of 1° C./second to an upper limit of a facility capacity, and to appropriately determine the cooling rate in a range of 1° C./second to the upper limit of the facility capacity. In a temper-rolling process, temper-rolling is carried out with a conventional method. An elongation ratio of the temper-rolling is, generally, approximately 0.2% to 5%, and is preferable within a range in which a yield point elongation is avoided and the shape of the steel sheet can be corrected.

As a still more preferable condition of the embodiment, when the amount of C (mass %), the amount of Mn (mass %), the amount of Si (mass %) and the amount of Mo (mass %) of the steel are represented by [C], [Mn], [Si] and [Mo] respectively, regarding the coiling temperature CT, it is preferable to satisfy a following expression (F).

$$560 - 474 \times [C] - 90 \times [Mn] - 20 \times [Cr] - 20 \times [Mo]$$
$$< CT < 830 - 270 \times [C] - 90 \times [Mn] - 70 \times [Cr] - 80 \times [Mo] \quad (F)$$

Figure 5A:
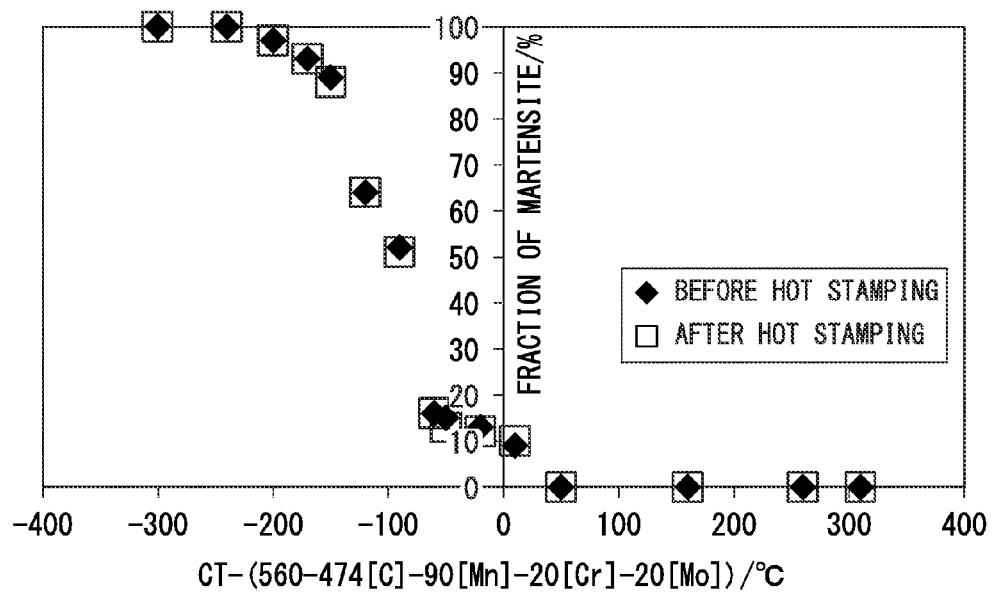
FIG. 5A is a graph illustrating the relationship between an expression (F) and a fraction of a martensite.
Figure 5B:
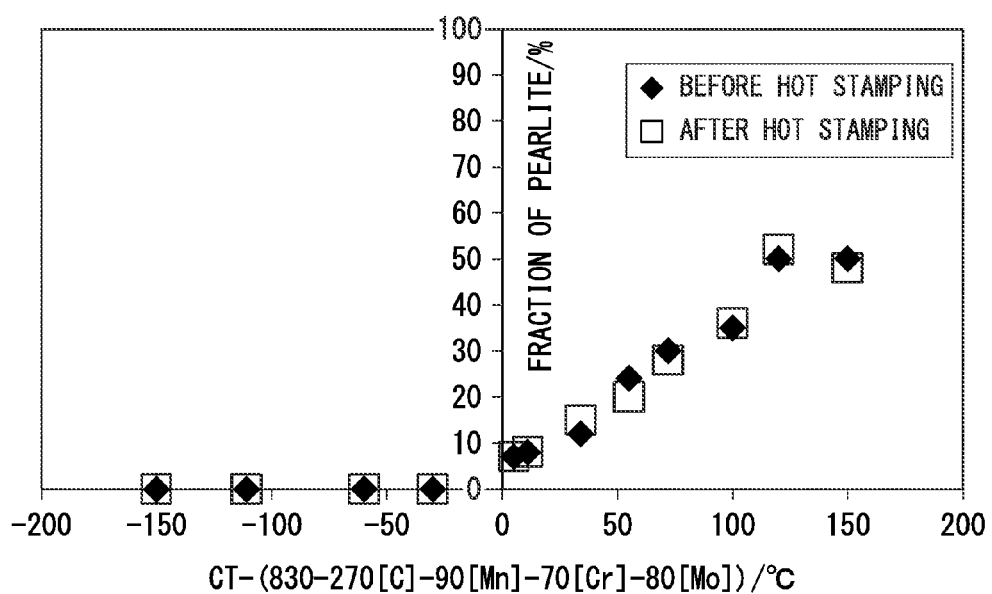
FIG. 5B is a graph illustrating the relationship between the expression (F) and a fraction of a pearlite.

As illustrated in FIG. 5A, when the coiling temperature CT is less than "560−474×[C]−90×[Mn]−20×[Cr]−20×[Mo]", the martensite is excessively formed, the steel sheet becomes too hard, and there is a case in which the following cold-rolling becomes difficult. On the other hand, as illustrated in FIG. 5B, when the coiling temperature CT exceeds "830−270×[C]−90×[Mn]−70×[Cr]−80×[Mo]", a banded structure of the ferrite and the pearlite is likely to be formed, and furthermore, a fraction of the pearlite in the central part of the sheet thickness is likely to increase. Therefore, a uniformity of a distribution of the martensite formed in the following annealing degrades, and it becomes difficult to satisfy the above-described expression (C). In addition, there is a case in which it becomes difficult for the martensite to be formed in a sufficient amount.

When the expression (F) is satisfied, the ferrite and the hard phase have an ideal distribution form before hot stamping as described above. In this case, when a two-phase region heating is carried out in the hot stamping, the distribution form is maintained as described above. If it is possible to more reliably ensure the above-described metallographic structure by satisfying the expression (F), the metallographic structure is maintained even after hot stamping, and the hot stamped steel becomes excellent in terms of the formability.

Furthermore, to improve the rust-preventing capability, it is also preferable to include a galvanizing process in which a galvanizing is formed between an annealing process and the temper-rolling process, and to form the galvanizing on a surface of the cold rolled steel sheet. Furthermore, it is also preferable to include an alloying process in which an alloying treatment is performed after galvanizing. In a case in which the alloying treatment is performed, a treatment in which a galvannealed surface is brought into contact with a substance oxidizing a sheet surface such as water vapor, thereby thickening an oxidized film may be further carried out on the surface.

It is also preferable to include, for example, an electrogalvanizing process in which an electrogalvanizing is formed after the temper-rolling process as well as the galvanizing and the galvannealing and to form an electrogalvanizing on the surface of the cold rolled steel sheet. In addition, it is also preferable to include, instead of the galvanizing, an aluminizing process in which an aluminizing is formed between the annealing process and the temper-rolling process, and to form the aluminizing on the surface of the cold rolled steel sheet. The aluminizing is generally hot dip aluminizing, which is preferable.

After a series of the above-described treatments, the hot stamping is carried out by heating the steel sheet to 700° C. to 1000° C. In the hot stamping process, the hot stamping is desirably carried out, for example, under the following conditions. First, the steel sheet is heated up to 700° C. to 1000° C. at the temperature-increase rate of 5° C./second to 500° C./second, and the hot stamping (a hot stamping process) is carried out after the holding time of 1 second to 120 seconds. To improve the formability, the heating temperature is preferably an $Ac_3$ temperature or less. The $Ac_3$ temperature was estimated from the inflection point of the length of the test specimen after carrying out the formastor test. Subsequently, the steel sheet is cooled, for example, to the room temperature to 300° C. at the cooling rate of 10° C./second to 1000° C./second (quenching in the hot stamping).

When the heating temperature in the hot stamping process is less than 700° C., the quenching is not sufficient, and consequently, the strength cannot be ensured, which is not preferable. When the heating temperature is more than 1000° C., the steel sheet becomes too soft, and, in a case in which a plating, particularly zinc plating, is formed on the surface of the steel sheet, and the sheet, there is a concern that the zinc may be evaporated and burned, which is not preferable. Therefore, the heating temperature in the hot stamping is preferably 700° C. to 1000° C. When the temperature-increase rate is less than 5° C./second, since it is difficult to control heating in the hot stamping, and the productivity significantly degrades, it is preferable to carry out the heating at the temperature-increase rate of 5° C./second or more. On the other hand, an upper limit of the temperature-increase rate of 500° C./second is depends on a current heating capability, but is not necessary to limit thereto. At the cooling rate of less than 10° C./second, since the rate control of the cooling after hot stamping process is difficult, and the productivity also significantly degrades, it is preferable to carry out the cooling at the cooling rate of 10° C./second or more. An upper limit of the cooling rate of 1000° C./second depends on a current cooling capability, but is not necessary to limit thereto. A reason for setting a time until the hot stamping after an increase in the temperature to 1 second or more is a current process control capability (a lower limit of a facility capability), and a reason for setting the time until the hot stamping after the increase in the temperature to 120 seconds or less is to avoid an evaporation of the zinc or the like in a case in which the galvanizing or the like is formed on the surface of the steel sheet. A reason for setting the cooling temperature to the room temperature to 300° C. is to sufficiently ensure the martensite and ensure the strength of the hot stamped steel.

Figure 8:
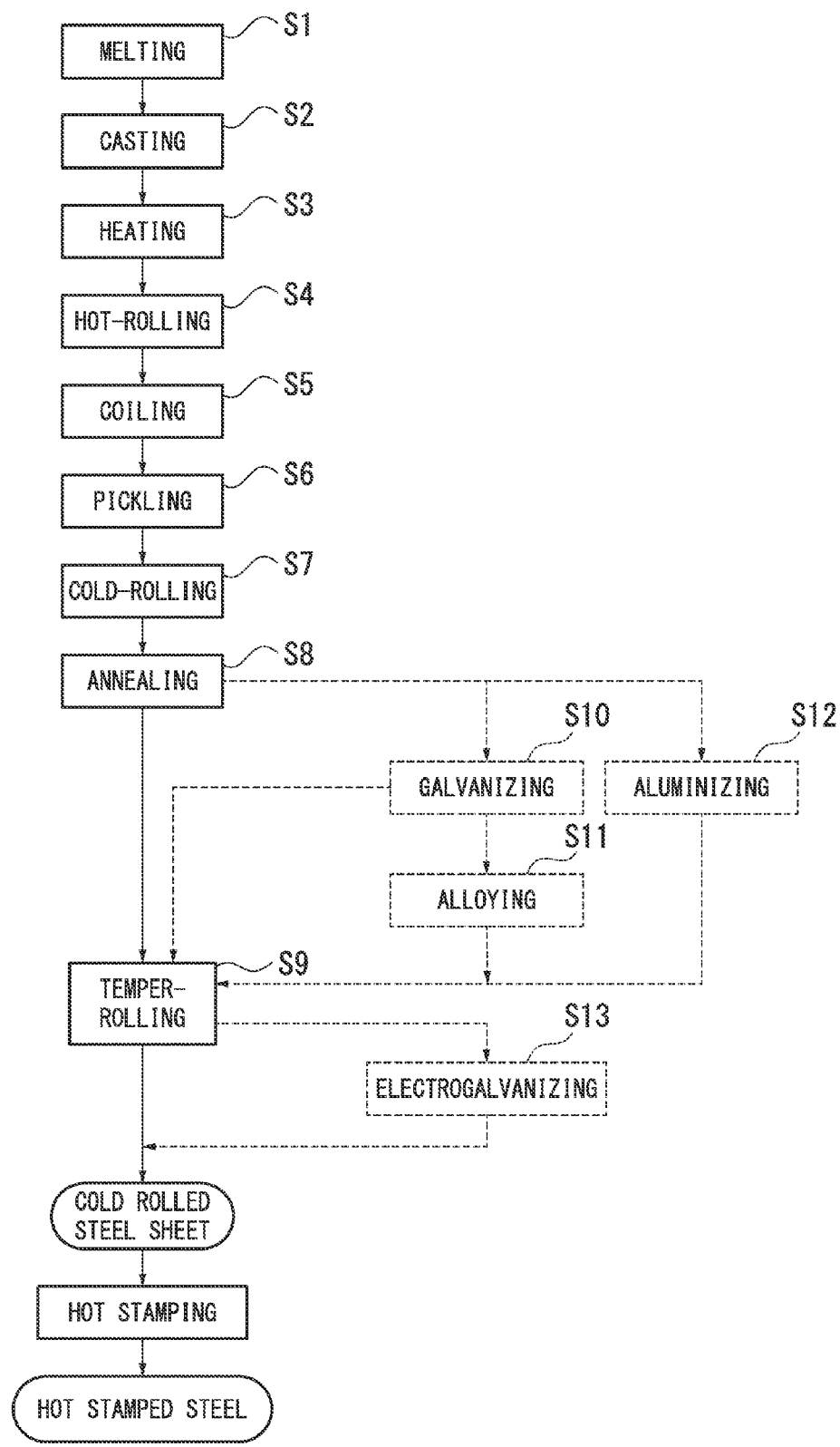
FIG. 8 is a flowchart illustrating a method for producing the hot stamped steel for which a cold rolled steel sheet for hot stamping is used according to an embodiment of the present invention.

FIG. 8 is a flowchart illustrating the method for producing the hot stamped steel for which a cold rolled steel sheet for hot stamping according to an embodiment of the present invention is used. Reference signs S1 to S13 in the drawing respectively correspond to individual process described above.

In the hot stamped steel of the embodiment, the expression (B) and the expression (C) are satisfied even after hot stamping is carried out under the above-described condition. In addition, consequently, it is possible to satisfy the condition of TS×λ50000 MPa·% even after hot stamping is carried out.

As described above, when the above-described conditions are satisfied, it is possible to manufacture the hot stamped steel in which the hardness distribution or the structure is maintained even after hot stamping, and consequently the strength is ensured and a more favorable hole expansibility can be obtained.

EXAMPLES

Figure 7:
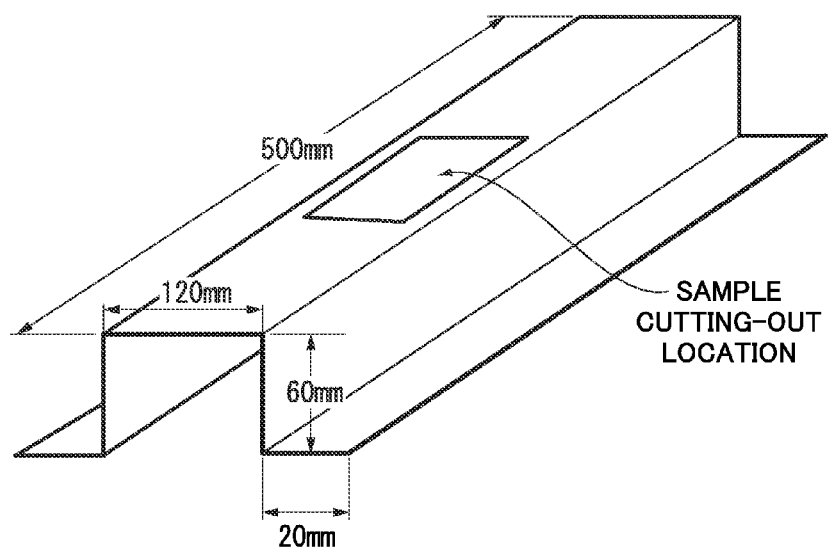
FIG. 7 is a perspective view of a hot stamped steel used in an example.

Steel having a composition described in Table 1 was continuously cast at a casting rate of 1.0 m/minute to 2.5 m/minute, a slab was heated in a heating furnace under a conditions shown in Table 2 with a conventional method as it is or after cooling the steel once, and hot-rolling was carried out at a finishing temperature of 910° C. to 930° C., thereby producing a hot rolled steel sheet. After that, the hot rolled steel sheet was coiled at a coiling temperature CT described in Table 1. After that, pickling was carried out so as to remove a scale on a surface of the steel sheet, and a sheet thickness was made to be 1.2 mm to 1.4 mm through cold-rolling. At this time, the cold-rolling was carried out so that the value of the expression (E) became a value described in Table 5. After cold-rolling, annealing was carried out in a continuous annealing furnace at an annealing temperature described in Table 2. On a part of the steel sheets, a galvanizing was further formed in the middle of cooling after a soaking in the continuous annealing furnace, and then an alloying treatment was further performed on the part of the steel sheets, thereby forming a galvannealing. In addition, an electrogalvanizing or an aluminizing was formed on the part of the steel sheets. Furthermore, temper-rolling was carried out at an elongation ratio of 1% according to a conventional method. In this state, a sample was taken to evaluate material qualities and the like before hot stamping, and a material quality test or the like was carried out. After that, to obtain a hot stamped steel having a form as illustrated in FIG. 7, hot stamping in which a temperature was increased at a temperature-increase rate of 10° C./second to 100° C./second, the steel sheet was held at a heating temperature of 780° C. for 10 seconds, and was cooled at a cooling rate of 100° C./second to 200° C. or less was carried out. A sample was cut from a location of FIG. 7 in an obtained hot stamped steel, the material quality test and the like were carried out, and the tensile strength (TS), the elongation (El), the hole expansion ratio (λ) and the like were obtained. The results are described in Table 2, Table 3 (continuation of Table 2), Table 4 and Table 5 (continuation of Table 4). The hole expansion ratios λ in the tables were obtained from a following expression (L).

$$\lambda(\%) = \{(d'-d)/d\} \times 100 \quad (L)$$

d': a hole diameter when a crack penetrates the sheet thickness d: an initial hole diameter Furthermore, regarding plating types in Table 2, CR represents a non-plated cold rolled steel sheet, GI represents that the galvanizing is formed, GA represents that the galvannealing is formed, EG represents that the electrogalvanizing is formed, and Al represents that the aluminizing is formed.

Furthermore, determinations G and B in the tables have the following meanings.

G: a target condition expression is satisfied.

B: the target condition expression is not satisfied.

In addition, since the expression (H), the expression (I) and the expression (J) are substantially the same as the expression (B), the expression (C) and the expression (D) respectively, in headings of the respective tables, the expression (B), the expression (C) and the expression (D) are described as representatives.

TABLE 1

| Steel type reference symbol | | C | Si | Mn | P | S | N | Al | Cr | Mo |
|---|---|---|---|---|---|---|---|---|---|---|
| A | Example | 0.042 | 0.145 | 1.55 | 0.003 | 0.008 | 0.0035 | 0.035 | 0 | 0 |
| B | " | 0.062 | 0.231 | 1.61 | 0.023 | 0.006 | 0.0064 | 0.021 | 0 | 0 |
| C | " | 0.144 | 0.950 | 2.03 | 0.008 | 0.009 | 0.0034 | 0.042 | 0.12 | 0 |
| D | " | 0.072 | 0.342 | 1.62 | 0.007 | 0.007 | 0.0035 | 0.042 | 0 | 0.15 |
| E | " | 0.074 | 0.058 | 1.54 | 0.008 | 0.008 | 0.0045 | 0.034 | 0.21 | 0 |
| F | " | 0.081 | 0.256 | 1.71 | 0.006 | 0.009 | 0.0087 | 0.041 | 0 | 0 |
| G | " | 0.095 | 0.321 | 1.51 | 0.012 | 0.008 | 0.0041 | 0.038 | 0 | 0 |
| H | " | 0.090 | 0.465 | 1.51 | 0.051 | 0.001 | 0.0035 | 0.032 | 0.32 | 0.05 |
| I | " | 0.084 | 0.512 | 1.54 | 0.008 | 0.002 | 0.0065 | 0.041 | 0 | 0 |
| J | " | 0.075 | 0.785 | 1.62 | 0.007 | 0.009 | 0.0014 | 0.025 | 0 | 0.31 |
| K | " | 0.089 | 0.145 | 1.52 | 0.006 | 0.008 | 0.0026 | 0.034 | 0 | 0 |
| L | " | 0.098 | 0.624 | 2.11 | 0.012 | 0.006 | 0.0035 | 0.012 | 0 | 0.21 |
| M | " | 0.103 | 0.325 | 1.58 | 0.011 | 0.005 | 0.0032 | 0.025 | 0 | 0 |
| N | " | 0.101 | 0.265 | 2.61 | 0.009 | 0.008 | 0.0035 | 0.041 | 0 | 0.31 |
| O | " | 0.142 | 0.955 | 1.74 | 0.007 | 0.007 | 0.0041 | 0.037 | 0 | 0.25 |
| P | " | 0.097 | 0.210 | 2.45 | 0.005 | 0.008 | 0.0022 | 0.045 | 0.42 | 0 |
| Q | " | 0.123 | 0.325 | 1.84 | 0.011 | 0.003 | 0.0037 | 0.035 | 0 | 0.11 |
| R | " | 0.113 | 0.120 | 2.06 | 0.008 | 0.004 | 0.0047 | 0.035 | 0 | 0 |
| S | " | 0.134 | 0.562 | 1.86 | 0.013 | 0.007 | 0.0034 | 0.034 | 0 | 0.12 |
| T | " | 0.141 | 0.150 | 2.35 | 0.018 | 0.003 | 0.0029 | 0.031 | 0 | 0.21 |
| U | " | 0.128 | 0.115 | 2.41 | 0.011 | 0.003 | 0.0064 | 0.021 | 0 | 0.31 |
| W | " | 0.142 | 0.562 | 2.03 | 0.012 | 0.007 | 0.0012 | 0.036 | 0 | 0 |
| X | " | 0.118 | 0.921 | 1.54 | 0.013 | 0.003 | 0.0087 | 0.026 | 0.15 | 0.11 |
| Y | " | 0.125 | 0.150 | 2.44 | 0.009 | 0.007 | 0.0087 | 0.034 | 0.32 | 0 |
| Z | " | 0.145 | 0.110 | 2.31 | 0.008 | 0.004 | 0.0069 | 0.035 | 0 | 0.15 |
| AA | " | 0.075 | 0.210 | 1.85 | 0.010 | 0.005 | 0.0025 | 0.025 | 0 | 0 |
| AB | " | 0.085 | 0.210 | 1.84 | 0.011 | 0.005 | 0.0032 | 0.032 | 0 | 0 |
| AC | " | 0.092 | 0.150 | 1.95 | 0.008 | 0.003 | 0.0035 | 0.035 | 0 | 0 |
| AD | " | 0.075 | 0.325 | 1.95 | 0.008 | 0.004 | 0.0034 | 0.031 | 0 | 0 |
| AE | " | 0.087 | 0.256 | 1.99 | 0.008 | 0.002 | 0.0030 | 0.031 | 0 | 0 |
| AF | " | 0.092 | 0.263 | 1.85 | 0.008 | 0.002 | 0.0030 | 0.031 | 0 | 0 |
| AG | Comparative Example | 0.111 | 0.526 | 1.85 | 0.007 | 0.003 | 0.0034 | 0.030 | 0 | 0 |
| AH | Comparative Example | <u>0.028</u> | 0.321 | 1.55 | 0.007 | 0.003 | 0.0035 | 0.035 | 0 | 0 |
| AI | Comparative Example | <u>0.252</u> | 0.512 | 2.15 | 0.003 | 0.006 | 0.0009 | 0.041 | 0 | 0 |
| AJ | Comparative Example | 0.075 | <u>0.005</u> | 2.12 | 0.007 | 0.009 | 0.0035 | 0.035 | 0 | 0.15 |
| AK | Comparative Example | 0.081 | <u>1.521</u> | 1.50 | 0.008 | 0.005 | 0.0034 | 0.026 | 0.28 | 0.32 |
| AL | Comparative Example | 0.099 | 0.660 | <u>0.08</u> | 0.009 | 0.003 | 0.0032 | 0.029 | 0 | 0 |
| AM | Comparative Example | 0.125 | 0.050 | <u>2.81</u> | 0.007 | 0.004 | 0.0034 | 0.036 | 0 | 0 |
| AN | Comparative Example | 0.131 | 0.321 | 2.05 | <u>0.091</u> | 0.003 | 0.0021 | 0.034 | 0.26 | 0.15 |
| AO | Comparative Example | 0.064 | 0.125 | 2.50 | 0.002 | <u>0.022</u> | 0.0059 | 0.034 | 0 | 0 |
| AP | Comparative Example | 0.039 | 0.265 | 1.52 | 0.011 | 0.009 | <u>0.0152</u> | 0.026 | 0 | 0 |

TABLE 1-continued

| | | | | | | | | | | |
|---|---|---|---|---|---|---|---|---|---|---|
| AQ | Comparative Example | 0.144 | 0.012 | 2.39 | 0.007 | 0.004 | 0.0065 | 0.003 | 0 | 0.20 |
| AR | Comparative Example | 0.142 | 0.150 | 2.35 | 0.005 | 0.003 | 0.0035 | 0.060 | 0 | 0.22 |
| AS | Comparative Example | 0.149 | 0.020 | 1.50 | 0.005 | 0.003 | 0.0020 | 0.025 | 0 | 0 |
| AT | Comparative Example | 0.132 | 0.090 | 2.05 | 0.005 | 0.003 | 0.0020 | 0.025 | 0 | 0 |
| AU | Comparative Example | 0.135 | 0.220 | 2.06 | 0.005 | 0.003 | 0.0020 | 0.025 | 0 | 0 |

| Steel type reference symbol | V | Ti | Nb | Ni | Cu | Ca | B | REM | Expression (A) |
|---|---|---|---|---|---|---|---|---|---|
| A | 0 | 0 | 0 | 0 | 0 | 0 | 0 | 0 | 54.2 |
| B | 0 | 0 | 0 | 0.3 | 0 | 0 | 0 | 0 | 44.6 |
| C | 0 | 0 | 0 | 0 | 0 | 0 | 0 | 0 | 47.1 |
| D | 0 | 0 | 0 | 0 | 0 | 0 | 0 | 0 | 46.3 |
| E | 0 | 0 | 0 | 0 | 0 | 0 | 0 | 0 | 24.7 |
| F | 0 | 0 | 0 | 0 | 0.4 | 0.004 | 0 | 0 | 36.9 |
| G | 0 | 0 | 0 | 0 | 0 | 0 | 0 | 0 | 32.8 |
| H | 0 | 0 | 0 | 0 | 0 | 0.003 | 0 | 0 | 42.6 |
| I | 0.03 | 0 | 0 | 0 | 0 | 0 | 0 | 0 | 48.8 |
| J | 0 | 0 | 0 | 0 | 0 | 0 | 0 | 0 | 73.9 |
| K | 0 | 0 | 0 | 0 | 0 | 0 | 0 | 0 | 25.2 |
| L | 0 | 0.05 | 0 | 0 | 0 | 0 | 0 | 0 | 53.4 |
| M | 0 | 0 | 0 | 0 | 0 | 0 | 0 | 0 | 31.1 |
| N | 0 | 0 | 0 | 0 | 0 | 0 | 0.0015 | 0 | 38.9 |
| O | 0 | 0 | 0 | 0 | 0 | 0 | 0 | 0 | 45.9 |
| P | 0 | 0 | 0 | 0 | 0 | 0 | 0 | 0 | 36.1 |
| Q | 0 | 0 | 0.01 | 0 | 0 | 0 | 0.0010 | 0 | 28.2 |
| R | 0 | 0 | 0.03 | 0 | 0 | 0 | 0 | 0 | 23.5 |
| S | 0 | 0 | 0 | 0 | 0 | 0 | 0 | 0 | 34.9 |
| T | 0 | 0.03 | 0 | 0 | 0 | 0 | 0 | 0 | 22.0 |
| U | 0 | 0 | 0 | 0 | 0 | 0 | 0.0008 | 0 | 23.3 |
| W | 0 | 0 | 0 | 0 | 0 | 0.002 | 0 | 0 | 34.1 |
| X | 0 | 0.05 | 0 | 0 | 0 | 0 | 0.0014 | 0.0005 | 52.1 |
| Y | 0 | 0 | 0 | 0 | 0 | 0 | 0.0015 | 0 | 25.5 |
| Z | 0.05 | 0 | 0 | 0 | 0 | 0 | 0 | 0 | 19.7 |
| AA | 0 | 0 | 0 | 0 | 0 | 0 | 0 | 0 | 38.7 |
| AB | 0 | 0 | 0 | 0 | 0 | 0 | 0 | 0 | 34.0 |
| AC | 0 | 0 | 0 | 0 | 0 | 0 | 0 | 0 | 29.3 |
| AD | 0 | 0 | 0 | 0 | 0 | 0 | 0 | 0 | 47.7 |
| AE | 0 | 0 | 0 | 0 | 0 | 0 | 0 | 0 | 37.6 |
| AF | 0 | 0 | 0 | 0 | 0 | 0 | 0 | 0 | 34.4 |
| AG | 0 | 0 | 0 | 0 | 0 | 0 | 0 | 0 | 40.4 |
| AH | 0 | 0 | 0 | 0 | 0 | 0 | 0 | 0.0006 | 112.7 |
| AI | 0 | 0 | 0 | 0 | 0 | 0 | 0 | 0 | 18.7 |
| AJ | 0 | 0 | 0 | 0 | 0 | 0 | 0.0012 | 0 | 28.6 |
| AK | 0 | 0 | 0 | 0 | 0 | 0 | 0.0015 | 0 | 112.4 |
| AL | 0 | 0 | 0 | 0 | 0 | 0 | 0 | 0 | 34.1 |
| AM | 0 | 0 | 0 | 0 | 0 | 0 | 0 | 0 | 24.5 |
| AN | 0 | 0 | 0.03 | 0 | 0 | 0 | 0 | 0 | 27.9 |
| AO | 0 | 0 | 0 | 0.2 | 0 | 0 | 0 | 0 | 48.8 |
| AP | 0 | 0 | 0.02 | 0 | 0 | 0.003 | 0 | 0 | 72.9 |
| AQ | 0 | 0 | 0 | 0 | 0 | 0 | 0 | 0 | 17.0 |
| AR | 0 | 0 | 0 | 0 | 0 | 0 | 0 | 0 | 21.8 |
| AS | 0 | 0 | 0 | 0 | 0 | 0 | 0.001 | 0 | 10.7 |
| AT | 0 | 0 | 0.01 | 0 | 0 | 0 | 0 | 0 | 18.9 |
| AU | 0 | 0.01 | 0 | 0 | 0 | 0 | 0 | 0 | 23.4 |

TABLE 2

| | | | | | | | | After annealing and temper-rolling and before hot stamping | | | | | | Pearlite area |
|---|---|---|---|---|---|---|---|---|---|---|---|---|---|---|
| Steel type reference symbol | Test reference symbol | Annealing temperature (° C.) | TS (Mpa) | EL (%) | λ (%) | TS × EL | TS × λ | Ferrite area fraction (%) | Martensite area fraction (%) | Ferrite + martensite area fraction (%) | Residual austenite area fraction (%) | Bainite area fraction (%) | Pearlite area fraction (%) | fraction before cold rolling (%) |
| A | 1 | 750 | 485 | 32.5 | 111 | 15763 | 53835 | 88 | 11 | 99 | 1 | 0 | 0 | 35 |
| B | 2 | 750 | 492 | 33.2 | 107 | 16334 | 52644 | 78 | 15 | 93 | 3 | 4 | 0 | 25 |
| C | 3 | 720 | 524 | 30.5 | 99 | 15982 | 51876 | 75 | 10 | 85 | 4 | 5 | 6 | 34 |
| D | 4 | 745 | 562 | 34.2 | 95 | 19220 | 53390 | 74 | 15 | 89 | 3 | 8 | 0 | 25 |

TABLE 2-continued

| Steel type reference symbol | Test reference symbol | Annealing temperature (° C.) | TS (Mpa) | EL (%) | λ (%) | TS × EL | TS × λ | Ferrite area fraction (%) | Martensite area fraction (%) | Ferrite + martensite area fraction (%) | Residual austenite area fraction (%) | Bainite area fraction (%) | Pearlite area fraction (%) | Pearlite area fraction before cold rolling (%) |
|---|---|---|---|---|---|---|---|---|---|---|---|---|---|---|
| E | 5 | 775 | 591 | 29.8 | 90 | 17612 | 53190 | 70 | 15 | 85 | 4 | 11 | 0 | 56 |
| F | 6 | 780 | 601 | 25.5 | 84 | 15326 | 50484 | 74 | 10 | 84 | 3 | 5 | 8 | 62 |
| G | 7 | 741 | 603 | 26.1 | 83 | 15738 | 50049 | 70 | 10 | 80 | 5 | 6 | 9 | 75 |
| H | 8 | 756 | 612 | 32.1 | 88 | 19645 | 53856 | 71 | 15 | 86 | 3 | 8 | 3 | 35 |
| I | 9 | 778 | 614 | 28.1 | 90 | 17253 | 55260 | 75 | 12 | 87 | 4 | 5 | 4 | 42 |
| J | 10 | 762 | 615 | 30.5 | 91 | 18758 | 55965 | 78 | 12 | 90 | 3 | 7 | 0 | 25 |
| K | 11 | 761 | 621 | 24.2 | 81 | 15028 | 50301 | 71 | 10 | 81 | 4 | 7 | 8 | 35 |
| L | 12 | 745 | 633 | 31.6 | 84 | 20003 | 53172 | 81 | 12 | 93 | 2 | 5 | 0 | 15 |
| M | 13 | 738 | 634 | 32.4 | 85 | 20542 | 53890 | 51 | 35 | 86 | 3 | 5 | 6 | 8 |
| N | 14 | 789 | 642 | 28.6 | 84 | 18361 | 53928 | 50 | 34 | 84 | 4 | 5 | 7 | 42 |
| O | 15 | 756 | 653 | 29.8 | 81 | 19459 | 52893 | 72 | 19 | 91 | 3 | 6 | 0 | 33 |
| P | 18 | 785 | 666 | 27.5 | 79 | 18315 | 52614 | 68 | 28 | 96 | 3 | 1 | 0 | 25 |
| Q | 17 | 777 | 671 | 26.5 | 80 | 17782 | 53680 | 52 | 41 | 93 | 3 | 4 | 0 | 34 |
| R | 16 | 746 | 684 | 21.5 | 80 | 14706 | 54720 | 51 | 35 | 86 | 4 | 10 | 0 | 52 |
| S | 19 | 789 | 712 | 24.1 | 74 | 17159 | 52688 | 48 | 38 | 86 | 4 | 10 | 0 | 46 |
| T | 20 | 785 | 745 | 28.5 | 71 | 21233 | 52895 | 44 | 41 | 85 | 3 | 12 | 0 | 18 |
| U | 21 | 746 | 781 | 20.2 | 69 | 15776 | 53889 | 41 | 42 | 83 | 5 | 12 | 0 | 22 |
| W | 22 | 845 | 812 | 17.4 | 65 | 14129 | 52780 | 45 | 39 | 84 | 4 | 12 | 0 | 15 |
| X | 23 | 800 | 988 | 17.5 | 55 | 17290 | 54340 | 42 | 46 | 88 | 2 | 5 | 5 | 45 |
| Y | 24 | 820 | 1012 | 17.4 | 54 | 17609 | 54648 | 41 | 41 | 82 | 2 | 16 | 0 | 42 |
| Z | 25 | 836 | 1252 | 13.5 | 45 | 16902 | 56340 | 41 | 48 | 89 | 2 | 9 | 0 | 10 |

TABLE 3

| Steel type reference symbol | Test reference symbol | Annealing temperature (° C.) | TS (Mpa) | EL (%) | λ (%) | TS × EL | TS × λ | Ferrite area fraction (%) | Martensite area fraction (%) | Ferrite + martensite area fraction (%) | Residual austenite area fraction (%) | Bainite area fraction (%) | Pearlite area fraction (%) | Pearlite area fraction before cold rolling (%) |
|---|---|---|---|---|---|---|---|---|---|---|---|---|---|---|
| AA | 26 | 794 | 625 | 24.4 | 72 | 15250 | 45000 | 59 | 10 | 69 | 2 | 16 | 13 | 27 |
| AB | 27 | 777 | 626 | 27.1 | 64 | 16965 | 40064 | 56 | 15 | 71 | 1 | 11 | 17 | 30 |
| AC | 28 | 754 | 594 | 28.0 | 78 | 16632 | 46332 | 58 | 12 | 70 | 2 | 14 | 14 | 24 |
| AD | 29 | 749 | 627 | 21.6 | 62 | 13543 | 38874 | 37 | 19 | 56 | 1 | 24 | 19 | 36 |
| AE | 30 | 783 | 627 | 24.9 | 71 | 15612 | 44517 | 66 | 10 | 76 | 2 | 10 | 12 | 21 |
| AF | 31 | 748 | 683 | 24.3 | 72 | 16597 | 49176 | 59 | 21 | 80 | 2 | 8 | 10 | 46 |
| AG | 32 | 766 | 632 | 28.6 | 58 | 18075 | 36656 | 69 | 20 | 89 | 2 | 9 | 0 | 25 |
| AH | 33 | 768 | 326 | 41.9 | 112 | 13659 | 36512 | 95 | 0 | 95 | 3 | 2 | 0 | 2 |
| AI | 34 | 781 | 1512 | 8.9 | 25 | 13457 | 37800 | 5 | 90 | 95 | 4 | 1 | 0 | 3 |
| AJ | 35 | 739 | 635 | 22.5 | 72 | 14288 | 45720 | 74 | 22 | 96 | 2 | 2 | 0 | 42 |
| AK | 36 | 789 | 625 | 31.2 | 55 | 19500 | 34375 | 75 | 22 | 97 | 2 | 1 | 0 | 15 |
| AL | 37 | 784 | 705 | 26.0 | 48 | 18330 | 33840 | 42 | 25 | 67 | 1 | 25 | 7 | 2 |
| AM | 38 | 746 | 795 | 15.6 | 36 | 12402 | 28620 | 30 | 52 | 82 | 3 | 10 | 5 | 14 |
| AN | 39 | 812 | 784 | 19.1 | 42 | 14974 | 32928 | 51 | 37 | 88 | 3 | 9 | 0 | 16 |
| AO | 40 | 826 | 602 | 30.5 | 35 | 18361 | 21070 | 68 | 21 | 89 | 4 | 7 | 0 | 22 |
| AP | 41 | 785 | 586 | 27.4 | 66 | 16056 | 38676 | 69 | 21 | 90 | 4 | 6 | 0 | 32 |
| AQ | 42 | 845 | 1254 | 7.5 | 25 | 9405 | 31350 | 11 | 68 | 79 | 4 | 11 | 6 | 22 |
| AR | 43 | 775 | 1480 | 9.6 | 26 | 14208 | 38480 | 12 | 69 | 81 | 3 | 16 | 0 | 5 |
| AS | 45 | 778 | 1152 | 12.0 | 42 | 13824 | 48384 | 41 | 35 | 76 | 0 | 23 | 1 | 5 |
| AT | 46 | 688 | 855 | 15.9 | 53 | 13595 | 45315 | 30 | 20 | 50 | 1 | 19 | 30 | 40 |
| AU | 47 | 893 | 1349 | 6.3 | 35 | 8499 | 47215 | 5 | 51 | 56 | 1 | 41 | 2 | 5 |

TABLE 4

| Steel type reference symbol | Test reference symbol | TS (Mpa) | EL (%) | λ (%) | TS × EL | TS × λ | Ferrite area fraction (%) | Martensite area fraction (%) | Ferrite + martensite area fraction (%) | Residual austenite area fraction (%) | Bainite area fraction (%) | Pearlite area fraction (%) | Plating type* |
|---|---|---|---|---|---|---|---|---|---|---|---|---|---|
| A | 1 | 445 | 41.2 | 125 | 18334 | 55625 | 87 | 11 | 98 | 1 | 0 | 1 | CR |
| B | 2 | 457 | 40.5 | 118 | 18509 | 53926 | 76 | 15 | 91 | 3 | 4 | 2 | GA |

TABLE 4-continued

| | | | | | | | After hot stamping | | | | | |
|---|---|---|---|---|---|---|---|---|---|---|---|---|
| Steel type reference symbol | Test reference symbol | TS (Mpa) | EL (%) | λ (%) | TS × EL | TS × λ | Ferrite area fraction (%) | Martensite area fraction (%) | Ferrite + martensite area fraction (%) | Residual austenite area fraction (%) | Bainite area fraction (%) | Pearlite area fraction (%) | Plating type*) |
| C | 3 | 532 | 35.2 | 101 | 18726 | 53732 | 75 | 10 | 85 | 1 | 5 | 9 | GI |
| D | 4 | 574 | 33.3 | 96 | 19114 | 55104 | 74 | 15 | 89 | 3 | 8 | 0 | EG |
| E | 5 | 591 | 30.9 | 86 | 18262 | 50826 | 69 | 15 | 84 | 1 | 11 | 4 | AI |
| F | 6 | 605 | 30.1 | 88 | 18211 | 53240 | 82 | 10 | 92 | 3 | 5 | 0 | CR |
| G | 7 | 611 | 30.8 | 87 | 18819 | 53157 | 75 | 15 | 90 | 1 | 6 | 3 | CR |
| H | 8 | 612 | 32.0 | 85 | 19584 | 52020 | 80 | 15 | 95 | 3 | 0 | 2 | GA |
| I | 9 | 785 | 25.3 | 65 | 19861 | 51025 | 56 | 15 | 71 | 4 | 23 | 2 | GA |
| J | 10 | 795 | 23.5 | 65 | 18683 | 51675 | 55 | 25 | 80 | 1 | 19 | 0 | GA |
| K | 11 | 815 | 23.5 | 71 | 19153 | 57865 | 50 | 32 | 82 | 1 | 17 | 0 | GA |
| L | 12 | 912 | 22.5 | 63 | 20520 | 57456 | 45 | 33 | 78 | 2 | 20 | 0 | GI |
| M | 13 | 975 | 20.6 | 60 | 20085 | 58500 | 50 | 41 | 91 | 3 | 5 | 1 | GA |
| N | 14 | 992 | 19.2 | 52 | 19046 | 51584 | 52 | 34 | 86 | 4 | 5 | 5 | GA |
| O | 15 | 1005 | 18.6 | 51 | 18693 | 51255 | 48 | 40 | 88 | 3 | 6 | 3 | GI |
| P | 16 | 1012 | 17.8 | 52 | 18014 | 52624 | 42 | 28 | 70 | 1 | 29 | 0 | GA |
| Q | 17 | 1023 | 18.2 | 50 | 18619 | 51150 | 46 | 41 | 87 | 3 | 4 | 6 | GA |
| R | 18 | 1031 | 18.0 | 55 | 18558 | 56705 | 51 | 35 | 86 | 4 | 10 | 0 | CR |
| S | 19 | 1042 | 20.5 | 48 | 21361 | 50016 | 52 | 38 | 90 | 4 | 0 | 6 | GA |
| T | 20 | 1125 | 18.5 | 48 | 20813 | 54000 | 41 | 41 | 82 | 3 | 12 | 3 | GI |
| U | 21 | 1185 | 16.0 | 45 | 18960 | 53325 | 42 | 42 | 84 | 1 | 12 | 3 | EG |
| W | 22 | 1201 | 15.6 | 46 | 18736 | 55246 | 43 | 39 | 82 | 4 | 12 | 2 | GA |
| X | 23 | 1224 | 14.9 | 41 | 18238 | 50184 | 41 | 46 | 87 | 2 | 10 | 1 | AI |
| Y | 24 | 1342 | 13.5 | 40 | 18117 | 53680 | 41 | 41 | 82 | 1 | 16 | 1 | GA |
| Z | 25 | 1482 | 12.5 | 40 | 18525 | 59280 | 41 | 48 | 89 | 1 | 9 | 1 | CR |

TABLE 5

| | | | | | | | After hot stamping | | | | | |
|---|---|---|---|---|---|---|---|---|---|---|---|---|
| Steel type reference symbol | Test reference symbol | TS (Mpa) | EL (%) | λ (%) | TS × EL | TS × λ | Ferrite area fraction (%) | Martensite area fraction (%) | Ferrite + martensite area fraction (%) | Residual austenite area fraction (%) | Bainite area fraction (%) | Pearlite area fraction (%) | Plating type*) |
| AA | 26 | 814 | 18.9 | 61 | 15385 | <u>49654</u> | <u>39</u> | 44 | 83 | 2 | 4 | <u>11</u> | GA |
| AB | 27 | 991 | 17.1 | 47 | 16946 | <u>46577</u> | <u>37</u> | 47 | 84 | 1 | 3 | <u>12</u> | CR |
| AC | 28 | 1004 | 16.5 | 47 | 16566 | <u>47188</u> | <u>36</u> | 44 | 80 | 2 | 7 | <u>11</u> | GA |
| AD | 29 | 1018 | 15.9 | 43 | 16186 | <u>43774</u> | <u>31</u> | 42 | 73 | 1 | 8 | <u>18</u> | EG |
| AE | 30 | 1018 | 16.3 | 48 | 16593 | <u>48864</u> | 43 | 40 | 83 | 2 | 3 | <u>12</u> | GI |
| AF | 31 | 1184 | 14.2 | 42 | 16813 | <u>49728</u> | <u>33</u> | 46 | 79 | 2 | 9 | <u>10</u> | AI |
| AG | 32 | 715 | 18.5 | 55 | 13228 | <u>39325</u> | 69 | 18 | 87 | 2 | 9 | 2 | CR |
| AH | 33 | 440 | 42.5 | 105 | 18700 | <u>46200</u> | <u>95</u> | <u>0</u> | 95 | 3 | 2 | 0 | GA |
| AI | 34 | 1812 | 8.5 | 26 | 15402 | <u>47112</u> | <u>5</u> | <u>90</u> | 95 | 4 | 1 | 0 | GA |
| AJ | 35 | 812 | 18.5 | 50 | 15022 | <u>40600</u> | 60 | <u>22</u> | 82 | 2 | 15 | 1 | GA |
| AK | 36 | 1012 | 17.2 | 41 | 17406 | <u>41492</u> | 55 | 42 | 97 | 2 | 1 | 0 | GA |
| AL | 37 | 1005 | 16.5 | 35 | 16583 | <u>35175</u> | 45 | 41 | 86 | 3 | 10 | 1 | GI |
| AM | 38 | 1002 | 15.0 | 41 | 15030 | <u>41082</u> | 45 | 41 | 86 | 3 | 10 | 1 | GI |
| AN | 39 | 1015 | 18.2 | 41 | 18473 | <u>41615</u> | 51 | 37 | 88 | 3 | 9 | 0 | GI |
| AO | 40 | 1111 | 17.0 | 36 | 18887 | <u>39996</u> | 50 | 30 | 80 | 4 | 7 | 9 | GI |
| AP | 41 | 566 | 31.0 | 71 | 17546 | <u>40186</u> | 48 | 40 | 88 | 4 | 6 | 2 | EG |
| AQ | 42 | 1312 | 11.1 | 31 | 14563 | <u>40672</u> | <u>11</u> | <u>68</u> | 79 | 4 | 11 | 6 | AI |
| AR | 43 | 1512 | 10.2 | 31 | 15422 | <u>46872</u> | <u>12</u> | <u>69</u> | 81 | 3 | 16 | 0 | GA |
| AS | 45 | 1242 | 10.0 | 39 | 12420 | <u>48438</u> | 41 | 32 | 73 | 3 | 21 | 3 | GA |
| AT | 46 | 991 | 13.1 | 40 | 12982 | <u>39640</u> | <u>24</u> | 34 | <u>58</u> | 1 | 14 | <u>27</u> | GA |
| AU | 47 | 1326 | 8.9 | 31 | 11801 | <u>41106</u> | <u>6</u> | <u>69</u> | 75 | 3 | 21 | 1 | GA |

TABLE 6

| Steel type reference symbol | Test reference symbol | Left side of expression (B) | Determination | Left side of expression (B) after hot stamping | Determination | Left side of expression (C) | Determination | Left side of expression (C) after hot stamping | Determination | Area fraction of MnS of 0.1 μm or more before hot stamping (%) | Area fraction of MnS of 0.1 μm or more after hot stamping (%) |
|---|---|---|---|---|---|---|---|---|---|---|---|
| A | 1 | 1.02 | G | 1.03 | G | 15 | G | 16 | G | 0.005 | 0.005 |
| B | 2 | 1.03 | G | 1.03 | G | 18 | G | 17 | G | 0.006 | 0.006 |
| C | 3 | 1.09 | G | 1.08 | G | 2 | G | 3 | G | 0.014 | 0.013 |

TABLE 6-continued

| Steel type reference symbol | Test reference symbol | Left side of expression (B) | Determination | Left side of expression (B) after hot stamping | Determination | Left side of expression (C) | Determination | Left side of expression (C) after hot stamping | Determination | Area fraction of MnS of 0.1 μm or more before hot stamping (%) | Area fraction of MnS of 0.1 μm or more after hot stamping (%) |
|---|---|---|---|---|---|---|---|---|---|---|---|
| D | 4 | 1.04 | G | 1.04 | G | 19 | G | 18 | G | 0.006 | 0.006 |
| E | 5 | 1.06 | G | 1.05 | G | 14 | G | 14 | G | 0.008 | 0.008 |
| F | 6 | 1.09 | G | 1.09 | G | 13 | G | 13 | G | 0.013 | 0.013 |
| G | 7 | 1.09 | G | 1.08 | G | 10 | G | 9 | G | 0.009 | 0.008 |
| H | 8 | 1.06 | G | 1.06 | G | 8 | G | 8 | G | 0.005 | 0.005 |
| I | 9 | 1.04 | G | 1.04 | G | 7 | G | 8 | G | 0.006 | 0.006 |
| J | 10 | 1.03 | G | 1.02 | G | 12 | G | 11 | G | 0.007 | 0.007 |
| K | 11 | 1.02 | G | 1.03 | G | 16 | G | 16 | G | 0.006 | 0.006 |
| L | 12 | 1.02 | G | 1.03 | G | 15 | G | 16 | G | 0.008 | 0.008 |
| M | 13 | 1.09 | G | 1.08 | G | 12 | G | 12 | G | 0.011 | 0.011 |
| N | 14 | 1.07 | G | 1.07 | G | 13 | G | 14 | G | 0.003 | 0.003 |
| O | 15 | 1.08 | G | 1.08 | G | 11 | G | 11 | G | 0.002 | 0.002 |
| P | 16 | 1.06 | G | 1.06 | G | 10 | G | 10 | G | 0.005 | 0.005 |
| Q | 17 | 1.05 | G | 1.06 | G | 11 | G | 11 | G | 0.006 | 0.006 |
| R | 18 | 1.03 | G | 1.03 | G | 17 | G | 16 | G | 0.007 | 0.007 |
| S | 19 | 1.07 | G | 1.07 | G | 18 | G | 18 | G | 0.008 | 0.008 |
| T | 20 | 1.09 | G | 1.08 | G | 10 | G | 10 | G | 0.004 | 0.004 |
| U | 21 | 1.09 | G | 1.09 | G | 5 | G | 6 | G | 0.012 | 0.012 |
| W | 22 | 1.08 | G | 1.08 | G | 6 | G | 6 | G | 0.006 | 0.006 |
| X | 23 | 1.07 | G | 1.06 | G | 12 | G | 8 | G | 0.007 | 0.007 |
| Y | 24 | 1.06 | G | 1.06 | G | 10 | G | 10 | G | 0.005 | 0.005 |
| Z | 25 | 1.04 | G | 1.03 | G | 15 | G | 17 | G | 0.006 | 0.006 |

TABLE 7

| Steel type reference symbol | Test reference symbol | Left side of expression (B) | Determination | Left side of expression (B) after hot stamping | Determination | Left side of expression (C) | Determination | Left side of expression (C) after hot stamping | Determination | Area fraction of MnS of 0.1 μm or more before hot stamping (%) | Area fraction of MnS of 0.1 μm or more after hot stamping (%) |
|---|---|---|---|---|---|---|---|---|---|---|---|
| AA | 26 | 1.12 | B | <u>1.12</u> | B | 21 | B | <u>21</u> | B | 0.010 | <u>0.010</u> |
| AB | 27 | 1.14 | B | <u>1.13</u> | B | 23 | B | <u>22</u> | B | 0.008 | 0.008 |
| AC | 28 | 1.11 | B | <u>1.11</u> | B | 20 | B | <u>20</u> | B | 0.006 | 0.006 |
| AD | 29 | 1.17 | B | <u>1.16</u> | B | 25 | B | <u>25</u> | B | 0.007 | 0.007 |
| AE | 30 | 1.13 | B | <u>1.13</u> | B | 22 | B | <u>21</u> | B | 0.009 | 0.009 |
| AF | 31 | 1.10 | B | 1.09 | G | 20 | B | 19 | G | 0.002 | 0.002 |
| AG | 32 | 1.12 | B | <u>1.13</u> | B | 22 | B | <u>23</u> | B | 0.003 | 0.003 |
| AH | 33 | 1.15 | B | <u>1.15</u> | B | 21 | B | <u>21</u> | B | 0.004 | 0.004 |
| AI | 34 | 1.23 | B | <u>1.18</u> | B | 25 | B | <u>25</u> | B | 0.006 | 0.006 |
| AJ | 35 | 1.21 | B | <u>1.21</u> | B | 22 | B | <u>22</u> | B | 0.007 | 0.007 |
| AK | 36 | 1.14 | B | <u>1.14</u> | B | 21 | B | <u>21</u> | B | 0.008 | 0.007 |
| AL | 37 | 0.36 | B | <u>0.37</u> | B | 31 | B | <u>30</u> | B | 0.006 | 0.006 |
| AM | 38 | 1.36 | B | <u>1.37</u> | B | 32 | B | <u>31</u> | B | 0.006 | 0.006 |
| AN | 39 | 1.23 | B | <u>1.25</u> | B | 25 | B | <u>28</u> | B | 0.009 | 0.008 |
| AO | 40 | 1.35 | B | <u>1.33</u> | B | 30 | B | <u>35</u> | B | 0.004 | 0.004 |
| AP | 41 | 1.05 | G | 1.04 | G | 12 | G | 11 | G | 0.006 | 0.006 |
| AQ | 42 | 1.15 | B | <u>1.16</u> | B | 21 | B | <u>25</u> | B | 0.003 | 0.003 |
| AR | 43 | 1.08 | G | 1.08 | G | 18 | G | 18 | G | 0.002 | 0.002 |
| AS | 45 | 1.19 | B | <u>1.17</u> | B | 24 | B | <u>23</u> | B | 0.005 | 0.005 |
| AT | 46 | 1.29 | B | <u>1.28</u> | B | 28 | B | <u>27</u> | B | 0.004 | 0.005 |
| AU | 47 | 1.09 | G | 1.09 | G | 19 | G | 19 | G | 0.005 | 0.005 |

TABLE 8

| Steel type reference symbol | Test reference symbol | Before hot stamping | | | | After hot stamping | | | | | |
|---|---|---|---|---|---|---|---|---|---|---|---|
| | | n10 | n20 | Left side of expression (D) | Determination | n1 | n2 | Left side of expression (D) | Determination | Left side of expression (E) | Determination |
| A | 1 | 9 | 13 | 1.4 | G | 9 | 12 | 1.3 | G | 1.4 | G |
| B | 2 | 3 | 4 | 1.3 | G | 3 | 4 | 1.3 | G | 1.2 | G |
| C | 3 | 2 | 3 | 1.5 | B | 2 | 3 | 1.5 | B | 1.1 | G |
| D | 4 | 6 | 7 | 1.2 | G | 5 | 6 | 1.2 | G | 1.4 | G |
| E | 5 | 2 | 2 | 1.0 | G | 2 | 2 | 1.0 | G | 1.6 | G |
| F | 6 | 2 | 2 | 1.0 | G | 2 | 2 | 1.0 | G | 1.2 | G |
| G | 7 | 1 | 1 | 1.0 | G | 1 | 1 | 1.0 | G | 1.3 | G |
| H | 8 | 5 | 5 | 1.0 | G | 5 | 6 | 1.2 | G | 1.2 | G |

TABLE 8-continued

| | | | | | | | | | | | |
|---|---|---|---|---|---|---|---|---|---|---|---|
| I | 9 | 4 | 5 | 1.3 | G | 4 | 5 | 1.3 | G | 1.7 | G |
| J | 10 | 3 | 4 | 1.3 | G | 3 | 4 | 1.3 | G | 1.4 | G |
| K | 11 | 7 | 7 | 1.0 | G | 7 | 8 | 1.1 | G | 1.1 | G |
| L | 12 | 5 | 6 | 1.2 | G | 5 | 6 | 1.2 | G | 1.3 | G |
| M | 13 | 11 | 19 | 1.7 | B | 11 | 18 | 1.6 | B | 1.3 | G |
| N | 14 | 6 | 7 | 1.2 | G | 6 | 8 | 1.3 | G | 1.2 | G |
| O | 15 | 2 | 2 | 1.0 | G | 2 | 2 | 1.0 | G | 1.6 | G |
| P | 16 | 4 | 5 | 1.3 | G | 4 | 5 | 1.3 | G | 1.7 | G |
| Q | 17 | 7 | 8 | 1.1 | G | 7 | 9 | 1.3 | G | 1.9 | G |
| R | 18 | 16 | 19 | 1.2 | G | 15 | 18 | 1.2 | G | 1.4 | G |
| S | 19 | 11 | 12 | 1.1 | G | 10 | 12 | 1.2 | G | 1.3 | G |
| T | 20 | 6 | 7 | 1.2 | G | 6 | 7 | 1.2 | G | 1.1 | G |
| U | 21 | 7 | 14 | 2.0 | B | 7 | 13 | 1.9 | B | 1.2 | G |
| W | 22 | 17 | 21 | 1.2 | G | 15 | 20 | 1.3 | G | 1.1 | G |
| X | 23 | 23 | 27 | 1.2 | G | 22 | 25 | 1.1 | G | 1.2 | G |
| Y | 24 | 21 | 28 | 1.3 | G | 20 | 28 | 1.4 | G | 1.4 | G |
| Z | 25 | 26 | 33 | 1.3 | G | 25 | 32 | 1.3 | G | 1.5 | G |

| Steel type reference symbol | Left side of expression (F) | CT | Right side of expression (F) | Determination | Temperature of heating furnace (° C.) | In-furnace time of heating furnace (minutes) | Left side of expression (G) | Determination |
|---|---|---|---|---|---|---|---|---|
| A | 401 | 550 | 679 | G | 1200 | 85 | 1918 | G |
| B | 386 | 620 | 668 | G | 1250 | 102 | 1948 | G |
| C | 307 | 542 | 600 | G | 1154 | 152 | 1317 | B |
| D | 377 | 553 | 653 | G | 1123 | 124 | 1748 | G |
| E | 382 | 632 | 657 | G | 1215 | 136 | 2231 | G |
| F | 368 | 664 | 654 | B | 1223 | 127 | 1873 | G |
| G | 379 | 701 | 668 | B | 1123 | 111 | 1831 | G |
| H | 374 | 631 | 643 | G | 1156 | 106 | 1778 | G |
| I | 382 | 558 | 669 | G | 1148 | 95 | 1670 | G |
| J | 372 | 559 | 639 | G | 1206 | 87 | 1522 | G |
| K | 381 | 674 | 669 | B | 1214 | 152 | 2235 | G |
| L | 319 | 452 | 597 | G | 1233 | 182 | 1524 | G |
| M | 369 | 442 | 660 | G | 1112 | 47 | 1422 | B |
| N | 271 | 512 | 543 | G | 1287 | 252 | 1513 | G |
| O | 331 | 612 | 615 | G | 1250 | 122 | 1535 | G |
| P | 285 | 487 | 554 | G | 1285 | 222 | 1587 | G |
| Q | 334 | 566 | 622 | G | 1156 | 135 | 1642 | G |
| R | 321 | 567 | 614 | G | 1222 | 185 | 1761 | G |
| S | 327 | 554 | 617 | G | 1232 | 122 | 1589 | G |
| T | 277 | 512 | 564 | G | 1256 | 152 | 1522 | G |
| U | 277 | 521 | 554 | G | 1256 | 138 | 1472 | B |
| W | 310 | 571 | 609 | G | 1250 | 145 | 1550 | G |
| X | 360 | 656 | 640 | B | 1150 | 138 | 1600 | G |
| Y | 275 | 522 | 554 | G | 1260 | 182 | 1526 | G |
| Z | 280 | 504 | 571 | G | 1250 | 151 | 1554 | G |

TABLE 9

| Steel type reference symbol | Test reference symbol | Before hot stamping | | | | After hot stamping | | | | | |
|---|---|---|---|---|---|---|---|---|---|---|---|
| | | n10 | n20 | Left side of expression (D) | Determination | n1 | n2 | Left side of expression (D) | Determination | Left side of expression (E) | Determination |
| AA | 26 | 12 | 14 | 1.2 | G | 12 | 15 | 1.3 | G | 0.9 | B |
| AB | 27 | 9 | 13 | 1.4 | G | 9 | 13 | 1.4 | G | 0.8 | B |
| AC | 28 | 14 | 18 | 1.3 | G | 14 | 19 | 1.4 | G | 0.8 | B |
| AD | 29 | 5 | 7 | 1.4 | G | 5 | 7 | 1.4 | G | 0.6 | B |
| AE | 30 | 12 | 16 | 1.3 | G | 12 | 15 | 1.3 | G | 0.7 | B |
| AF | 31 | 17 | 23 | 1.4 | G | 16 | 22 | 1.4 | G | 1.0 | B |
| AG | 32 | 5 | 6 | 1.2 | G | 5 | 7 | 1.4 | G | 0.9 | B |
| AH | 33 | 3 | 4 | 1.3 | G | 3 | 4 | 1.3 | G | 1.1 | G |
| AI | 34 | 12 | 16 | 1.3 | G | 12 | 15 | 1.3 | G | 1.1 | G |
| AJ | 35 | 16 | 21 | 1.3 | G | 15 | 20 | 1.3 | G | 1.3 | G |
| AK | 36 | 11 | 13 | 1.2 | G | 11 | 12 | 1.1 | G | 1.2 | G |
| AL | 37 | 12 | 18 | 1.5 | G | 12 | 17 | 1.4 | G | 1.1 | G |
| AM | 38 | 15 | 20 | 1.3 | G | 14 | 20 | 1.4 | G | 1.2 | G |
| AN | 39 | 10 | 11 | 1.1 | G | 10 | 12 | 1.2 | G | 1.1 | G |
| AO | 40 | 9 | 11 | 1.2 | G | 8 | 11 | 1.4 | G | 1.2 | G |
| AP | 41 | 6 | 8 | 1.3 | G | 6 | 8 | 1.3 | G | 1.1 | G |
| AQ | 42 | 12 | 14 | 1.2 | G | 12 | 15 | 1.3 | G | 1.1 | G |
| AR | 43 | 21 | 24 | 1.1 | G | 22 | 25 | 1.1 | G | 1.5 | G |
| AS | 45 | 17 | 19 | 1.1 | G | 15 | 18 | 1.2 | G | 1.3 | G |

TABLE 9-continued

| | | | | | | | | | | | |
|---|---|---|---|---|---|---|---|---|---|---|---|
| AT | 46 | 16 | 16 | 1.0 | G | 15 | 17 | 1.1 | G | 1.3 | G |
| AU | 47 | 16 | 19 | 1.2 | G | 15 | 18 | 1.2 | G | 1.6 | G |

| Steel type reference symbol | Left side of expression (F) | CT | Right side of expression (F) | Determination | Temperature of heating furnace (° C.) | In-furnace time of heating furnace (minutes) | Left side of expression (G) | Determination |
|---|---|---|---|---|---|---|---|---|
| AA | 358 | 602 | 643 | G | 1200 | 132 | 1746 | G |
| AB | 354 | 505 | 641 | G | 1200 | 126 | 1739 | G |
| AC | 341 | 506 | 630 | G | 1188 | 133 | 1677 | G |
| AD | 349 | 443 | 634 | G | 1165 | 145 | 1593 | G |
| AE | 340 | 611 | 627 | G | 1152 | 152 | 1590 | G |
| AF | 350 | 352 | 639 | G | 1187 | 89 | 1563 | G |
| AG | 341 | 555 | 634 | G | 1201 | 152 | 1644 | G |
| AH | 407 | 436 | 683 | G | 1203 | 125 | 1965 | G |
| AI | 247 | 541 | 568 | G | 1250 | 175 | 1549 | G |
| AJ | 331 | 577 | 607 | G | 1200 | 96 | 1518 | G |
| AK | 375 | 578 | 628 | G | 1201 | 166 | 1508 | G |
| AL | 506 | 578 | 796 | G | 1285 | 205 | 8593 | G |
| AM | 248 | 533 | 543 | G | 1285 | 312 | 1529 | G |
| AN | 305 | 580 | 580 | G | 1212 | 125 | 1538 | G |
| AO | 302 | 564 | 578 | G | 1285 | 185 | 1535 | G |
| AP | 405 | 582 | 683 | G | 1200 | 135 | 2066 | G |
| AQ | 273 | 477 | 560 | G | 1250 | 166 | 1568 | G |
| AR | 277 | 504 | 563 | G | 1254 | 222 | 1634 | G |
| AS | 354 | 620 | 655 | G | 1224 | 201 | 2526 | G |
| AT | 313 | 550 | 610 | G | 1199 | 201 | 1779 | G |
| AU | 311 | 552 | 608 | G | 1184 | 201 | 1687 | G |

Based on the above-described examples, as long as the conditions of the present invention are satisfied, it is possible to obtain a hot stamped steel for which an excellent cold rolled steel sheet for hot stamping, an excellent galvanized cold rolled steel sheet for hot stamping, an excellent galvannealed cold rolled steel sheet for hot stamping, an excellent electrogalvanized cold rolled steel sheet for hot stamping or an excellent alluminized cold rolled steel sheet for hot stamping all of which satisfy TS×λ≥50000 MPa·% is used, even after hot stamping.

INDUSTRIAL APPLICABILITY

Since the hot stamped steel, which are obtained in the present invention and for which the cold rolled steel sheet for hot stamping is used, can satisfy TS×λ≥50000 MPa·% after hot stamping, the hot stamped steel has a high press workability and a high strength, and satisfies the current requirements for a vehicle such as an additional reduction of the weight and a more complicated shape of a component.

BRIEF DESCRIPTION OF THE REFERENCE SYMBOLS

S1: MELTING PROCESS
S2: CASTING PROCESS
S3: HEATING PROCESS
S4: HOT-ROLLING PROCESS
S5: COILING PROCESS
S6: PICKLING PROCESS
S7: COLD-ROLLING PROCESS
S8: ANNEALING PROCESS
S9: TEMPER-ROLLING PROCESS
S10: GALVANIZING PROCESS
S11: ALLOYING PROCESS
S12: ALUMINIZING PROCESS
S13: ELECTROGALVANIZING PROCESS

The invention claimed is:
1. A hot stamped steel comprising, by mass %:
C: 0.030% to 0.150%;
Si: 0.010% to 1.00%;
Mn: 1.50% to 2.70%;
P: 0.001% to 0.060%;
S: 0.001% to 0.010%;
N: 0.0005% to 0.0100%;
Al: 0.010% to 0.050%, and
optionally one or more of
B: 0.0005% to 0.0020%;
Mo: 0.01% to 0.50%;
Cr: 0.01% to 0.50%;
V: 0.001% to 0.100%;
Ti: 0.001% to 0.100%;
Nb: 0.001% to 0.050%;
Ni: 0.01% to 1.00%;
Cu: 0.01% to 1.00%;
Ca: 0.0005% to 0.0050%;
REM: 0.0005% to 0.0050%, and
a balance including Fe and unavoidable impurities, wherein
when [C] represents an amount of C by mass %, [Si] represents an amount of Si by mass %, and [Mn] represents an amount of Mn by mass %, a following expression (A) is satisfied,
a metallographic structure after a hot stamping includes 40% to 90% of a ferrite and 10% to 60% of a martensite in an area fraction,
a total of an area fraction of the ferrite and an area fraction of the martensite is 60% or more,
the metallographic structure optionally further includes one or more of 10% or less of a pearlite in an area fraction, 5% or less of a retained austenite in a volume ratio, and less than 40% of a bainite as a remainder in an area fraction,
a hardness of the martensite measured with a nanoindenter satisfies a following expression (B) and a following expression (C),

TS×λ which is a product of a tensile strength TS and a hole expansion ratio λ is 50000 MPa·% or more, $$(5\times[Si]+[Mn])/[C]>11 \quad (A),$$

$$H2/H1<1.10 \quad (B),$$

$$\sigma HM<20 \quad (C), \text{ and}$$

the H1 is an average hardness of the martensite in a surface part of a sheet thickness after the hot stamping, the H2 is an average hardness of the martensite in a central part of the sheet thickness which is an area having a width of 200 μm in a thickness direction at a center of the sheet thickness after the hot stamping, and the σHM is a variance of the average hardness of the martensite in the central part of the sheet thickness after the hot stamping.

2. The hot stamped steel according to claim 1, wherein an area fraction of MnS existing in the hot stamped steel and having an equivalent circle diameter of 0.1 μm to 10 μm is 0.01% or less, a following expression (D) is satisfied, $$n2/n1<1.5 \quad (D), \text{ and}$$

the n1 is an average number density per 10000 μm2 of the MnS having the equivalent circle diameter of 0.1 μm to 10 μm in a ¼ part of the sheet thickness after the hot stamping, and the n2 is an average number density per 10000 μm2 of the MnS having the equivalent circle diameter of 0.1 μm to 10 μm in the central part of the sheet thickness after the hot stamping.

3. The hot stamped steel according to claim 1 or 2, wherein a hot dip galvanizing is formed on a surface thereof.

4. The hot stamped steel according to claim 3, wherein a galvannealing is formed on a surface of the hot dip galvanizing.

5. The hot stamped steel according to claim 1 or 2, wherein an electrogalvanizing is formed on a surface thereof.

6. The hot stamped steel according to claim 1 or 2, wherein an aluminizing is formed on a surface thereof.

7. A method for producing a hot stamped steel, the method comprising:
casting a molten steel having a chemical composition according to claim 1 and obtaining a steel;
heating the steel;
hot-rolling the steel with a hot-rolling mill including a plurality of stands;
coiling the steel after the hot-rolling;
pickling the steel after the coiling;
cold-rolling the steel with a cold-rolling mill including a plurality of stands after the pickling under a condition satisfying a following expression (E);
annealing in which the steel is annealed under 700° C. to 850° C. and cooled after the cold-rolling;
temper-rolling the steel after cooled following annealed;
hot stamping in which the steel is heated to a temperature range of 700° C. to 1000° C. after the temper-rolling, hot-stamped within the temperature range, and thereafter cooled to a room temperature or more and 300° C. or less, $$1.5\times r1/r+1.2\times r2/r+r3/r>1.0 \quad (E), \text{ and}$$

the ri (i=1, 2, 3) represents an individual target cold-rolling reduction at an ith stand (i=1, 2, 3) based on an uppermost stand in the plurality of stands in the cold-rolling in unit %, and the r represents a total cold-rolling reduction in the cold-rolling in unit %.

8. The method for producing the hot stamped steel according to claim 7, wherein
when CT represents a coiling temperature in the coiling in unit ° C., [C] represents the amount of C by mass %, [Mn] represents the amount of Mn by mass %, [Cr] represents the amount of Cr by mass %, and [Mo] represents the amount of Mo by mass %, a following expression (F) is satisfied, $$560-474\times[C]-90\times[Mn]-20\times[Cr]-20\times[Mo] <CT<830-270\times[C]-90\times[Mn]-70\times[Cr]-80\times[Mo] \quad (F).$$

9. The method for producing the hot stamped steel according to claim 8, wherein
when T represents a heating temperature in the heating in unit ° C., t represents an in-furnace time in the heating in unit minute, [Mn] represents the amount of Mn by mass % in the steel sheet, and [S] represents an amount of S by mass % in the steel sheet, a following expression (G) is satisfied $$T\times\ln(t)/(1.7\times[Mn]+[S])>1500 \quad (G).$$

10. The method for producing the hot stamped steel according to any one of claims 7 to 9, further comprising:
galvanizing the steel between the annealing and the temper-rolling.

11. The method for producing the hot stamped steel according to claim 10, further comprising:
alloying the steel between the galvanizing and the temper-rolling.

12. The method for producing the hot stamped steel according to any one of claims 7 to 9, further comprising:
electrogalvanizing the steel after the temper-rolling.

13. The method for producing the hot stamped steel according to any one of claims 7 to 9, further comprising:
aluminizing the steel between the annealing and the temper-rolling.

* * * * *